US012530722B2

(12) United States Patent
Jiang et al.

(10) Patent No.: US 12,530,722 B2
(45) Date of Patent: Jan. 20, 2026

(54) ASSET VALUE EVALUATION METHOD AND APPARATUS, MODEL TRAINING METHOD AND APPARATUS, AND READABLE STORAGE MEDIUM

(71) Applicants: Beijing BOE Technology Development Co., Ltd., Beijing (CN); BOE Technology Group Co., Ltd., Beijing (CN)

(72) Inventors: Boran Jiang, Beijing (CN); Qiong Wu, Beijing (CN); Shuqi Wei, Beijing (CN); Chao Ji, Beijing (CN); Chuqian Zhong, Beijing (CN); Ge Ou, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/291,561

(22) PCT Filed: Sep. 29, 2021

(86) PCT No.: PCT/CN2021/121958
§ 371 (c)(1),
(2) Date: Jan. 23, 2024

(87) PCT Pub. No.: WO2023/050232
PCT Pub. Date: Apr. 6, 2023

(65) Prior Publication Data
US 2024/0370928 A1    Nov. 7, 2024

(51) Int. Cl.
*G06F 16/00*    (2019.01)
*G06N 20/00*    (2019.01)
*G06Q 40/06*    (2012.01)

(52) U.S. Cl.
CPC ............ *G06Q 40/06* (2013.01); *G06N 20/00* (2019.01)

(58) Field of Classification Search
None
See application file for complete search history.

(56) References Cited

U.S. PATENT DOCUMENTS

2003/0101119 A1 * 5/2003 Parsons .................. G06Q 40/04
  705/36 R
2007/0162376 A1 * 7/2007 Mathews ................ G06Q 40/04
  705/36 R (Continued)

FOREIGN PATENT DOCUMENTS

CN     101030269 A      9/2007
CN     110457441 A  * 11/2019  ......... G06Q 30/0278

(Continued)

OTHER PUBLICATIONS

PCT/CN2021/121958 international search report dated Jun. 17, 2022.

*Primary Examiner* — Jean M Corrielus
(74) *Attorney, Agent, or Firm* — IPro, PLLC

(57) ABSTRACT

Disclosed are an asset value evaluation method and apparatus, a model training method and apparatus, and a readable storage medium. The asset value evaluation method includes: acquiring input asset value query information for a user; when it is determined that there is historical asset interaction information of the user, determining an asset set obtained by means of making a query using the asset value query information, the asset set includes at least one asset; performing embedding representation on each asset, so as to determine an asset embedding vector of each asset, the asset embedding vector is obtained by means of training based on the relationship between each asset and an attribute, and the attribute is used for representing an inherent parameter of (Continued)

the asset; and inputting the asset embedding vector of each asset into a graph convolutional network model to obtain the value of each asset for the user.

18 Claims, 13 Drawing Sheets

(56) References Cited

U.S. PATENT DOCUMENTS

| | | | | |
|---|---|---|---|---|
| 2007/0208739 | A1* | 9/2007 | Lee | G06Q 10/00 |
| 2016/0140652 | A1* | 5/2016 | Ghosh | G06Q 40/02 |
| | | | | 705/35 |
| 2020/0074301 | A1* | 3/2020 | Shang | G06N 5/02 |
| 2021/0391080 | A1* | 12/2021 | Fan | G06F 40/30 |
| 2022/0237480 | A1* | 7/2022 | Zhang | G06N 3/045 |

FOREIGN PATENT DOCUMENTS

| | | | | | |
|---|---|---|---|---|---|
| CN | 111159426 | A | * | 5/2020 | G06N 3/045 |
| CN | 111160783 | A | * | 5/2020 | G06Q 10/06393 |

* cited by examiner

ASSET VALUE EVALUATION METHOD AND APPARATUS, MODEL TRAINING METHOD AND APPARATUS, AND READABLE STORAGE MEDIUM

CROSS-REFERENCE TO RELATED APPLICATIONS

The application is a National Stage of International Application No. PCT/CN2021/121958, filed Sep. 29, 2021.

TECHNICAL FIELD

The present disclosure relates to the field of computer technology, in particular to an asset value evaluation method and apparatus, a model training method and apparatus, and a readable storage medium.

BACKGROUND

With the development of the market economy, transactions of assets such as commodities and patents have become more frequent, so how to realize the evaluation of asset value becomes extremely important.

SUMMARY

The present disclosure provides an asset value evaluation method and apparatus, a model training method and apparatus, and a readable storage medium for improving the accuracy of asset value evaluation.

In the first aspect, an embodiment of the present disclosure provides an asset value evaluation method, including:
obtaining input asset value query information for a user;
when determining historical asset interaction information of the user exists, determining an asset set queried by using the asset value query information, where the asset set includes at least one asset;
performing an embedding representation for each asset in the asset set, and determining an asset embedding vector of each asset, where the asset embedding vector is obtained by training based on a relationship between each asset and asset attribute, and the asset attribute is configured to characterize an intrinsic parameter of the asset; and
obtaining a value of each asset to the user by inputting the asset embedding vector of each asset into a graph convolutional network model.

In some embodiments, a training process based on the relationship between the asset and the asset attribute includes:
determining a format of each asset as a first-type triplet, where the first-type triplet is entity-asset attribute-asset attribute value; and
initializing an embedding vector of the first-type triplet and performing training on the embedding vector of the first-type triplet to obtain the asset embedding vector.

In some embodiments, the initializing the embedding vector of the first-type triplet includes:
encoding the first-type triplet by means of a Bi-LSTM network to obtain an initialization embedding vector of the first-type triplet.

In some embodiments, the training process based on the relationship between the asset and the asset attribute further includes:
determining a format of each asset as a second-type triplet, where the second-type triplet is head entity-relationship-tail entity; and
performing embedded training on the first-type triplet and the second-type triplet by means of an entity and asset attribute joint model, and determining the embedding vector of the first-type triplet and an embedding vector of the second-type triplet.

In some embodiments, the performing the embedded training on the first-type triplet and the second-type triplet by means of the entity and asset attribute joint model, and determining the embedding vector of the first-type triplet and the embedding vector of the second-type triplet includes:
performing, based on the initialization embedding vector of the first-type triplet, the embedded training on the first-type triplet by means of a first graph embedding translate model in the entity and asset attribute joint model;
performing the embedded training on the second-type triplet by means of a second graph embedding translate model in the entity and asset attribute joint model; and
performing joint loss training based on a loss function of the first graph embedding translate model and a loss function of the second graph embedding translate model to obtain the embedding vectors of the first-type triplet and the second-type triplet.

In some embodiments, before the obtaining the input asset value query information for the user, the method further includes:
constructing an asset knowledge graph, where the asset knowledge graph includes multiple first-type triplets in a format that is entity-asset attribute-asset attribute value and multiple second-type triplets in a format that is head entity-relationship-tail entity.

In some embodiments, before the obtaining the input asset value query information for the user, the method further includes:
determining a historical asset set having an interaction event with the user according to the asset knowledge graph, where the historical asset set includes at least one historical asset;
constructing an asset value training sample according to the historical asset set; and
performing training on the graph convolutional network model according to the asset value training sample, where an asset value in the asset value training sample to the user is determined according to the interaction event.

In some embodiments, the determining the asset value in the asset value training sample to the user according to the interaction event further includes:
determining a path length between a node where the user is located and a node where each historical asset in the historical asset set is located in the asset knowledge graph; and
determining a value of each historical asset in the historical asset set to the user, where the longer the path length according to the interaction event and the path length, the lower the value of the historical asset corresponding to the path to the user.

In some embodiments, the determining the value of each historical asset in the historical asset set to the user according to the interaction event and the path length includes:
determining the value of each historical asset in the historical asset set to the user by a following formula:

$$V = A^{l-1} basevalue;$$

where, l represents the path length between the node where the user is located and the node where each historical asset in the historical asset set is located, basevalue represents a base value corresponding to the interaction event, and A is a constant less than 1.

In some embodiments, the obtaining the value of each asset to the user by inputting the asset embedding vector of each asset into the graph convolutional network model includes:

determining a similarity between an embedding vector of any target asset in the asset set and a head entity in an adjacent triplet in a relational space, where the higher the similarity, the closer the head entity in the adjacent triplet is associated with the target asset, the adjacent triplet includes at least one triplet;

propagating to a tail entity of the adjacent triplet with the similarity as a weight, and after n times of propagation by means of the graph convolutional network model, obtaining a final embedding vector of the user, where n is a positive integer;

splicing the embedding vector of the target asset and the final embedding vector of the user by means of a splicing layer of the graph convolutional network model to obtain a spliced vector; and inputting the spliced vector into a fully connected layer of the graph convolutional network model, and outputting a value of the target asset to the user by means of the fully connected layer.

In some embodiments, the inputting the spliced vector into a fully connected layer of the graph convolutional network model, and outputting a value of the target asset to the user by means of the fully connected layer includes:

obtaining the value of the target asset to the user by means of the fully connected layer of the graph convolutional network model by a following formula:

$$y = \sigma(concat(C, v) \cdot \omega + b);$$

where $\sigma$ represents a sigmoid activation function, C represents the final embedding vector of the user, v represents the embedding vector of the target asset, w represents the weight, and b represents a bias.

In some embodiments, the obtaining the input asset value query information for the user includes:

obtaining input user information configured to characterize the user and a to-be-evaluated asset set, to cause that the graph convolutional network model outputs a value of each to-be-evaluated asset in the to-be-evaluated asset set to the user.

In some embodiments, the obtaining the input asset value query information for the user includes:

obtaining input user information configured to characterize the user, to cause that the graph convolutional network model outputs at least one asset whose value to the user meets a preset value.

In the second aspect, an embodiment of the present disclosure also provides a model training method, including:

obtaining historical asset interaction information of a user;

determining a historical asset set having an interaction event with the user according to the historical asset interaction information, where the historical asset set includes at least one historical asset;

making an embedding representation for each historical asset in the historical asset set, and determining an asset embedding vector of each historical asset, where the asset embedding vector of each historical asset is obtained by training based on a relationship between each historical asset and an asset attribute, and the asset attribute is configured to characterize an inherent parameter of each historical asset; and inputting the asset embedding vector of each historical asset into a to-be-trained graph convolutional network model, and performing training on the to-be-trained graph convolutional network model to obtain a graph convolutional network model.

In some embodiments, a training process based on the relationship between each historical asset and an asset attribute includes:

determining a format of each historical asset as a first-type triplet, where the first-type triplet is entity-asset attribute-asset attribute value; and initializing an embedding vector of the first-type triplet and performing training on the embedding vector of the first-type triplet to obtain the asset embedding vector of the historical asset.

In some embodiments, the training process based on an entity and an asset attribute of each historical asset further includes:

determining a format of each historical asset as a second-type triplet, where the second-type triplet is head entity-relationship-tail entity; and performing embedded training on the first-type triplet and the second-type triplet by means of an entity and asset attribute joint model, and determining the embedding vector of the first-type triplet and an embedding vector of the second-type triplet.

In some embodiments, after determining the historical asset set having the interaction event with the user according to the historical asset interaction information, the method further includes:

determining a value of each historical asset to the user based on the interaction event; and constructing an asset value training sample for training the to-be-trained graph convolutional network model according to the value of each historical asset to the user.

In some embodiments, the inputting the asset embedding vector of each historical asset into the to-be-trained graph convolutional network model, and performing training on the to-be-trained graph convolutional network model to obtain the graph convolutional network model includes:

determining each historical asset having an interaction event with the user in the asset value training sample according to a pre-constructed asset knowledge group;

determining a similarity between an embedding vector of any target historical asset in historical assets and a head entity in an adjacent triplet in a relational space, where the higher the similarity, the closer the head entity is associated with the target historical asset, the adjacent triplet includes at least one triplet;

propagating to a tail entity of the adjacent triplet with the similarity as a weight, and after n times of propagation by means of the to-be-trained graph convolutional network model, obtaining a final embedding vector of the user, where n is a positive integer;

splicing the embedding vector of the target historical asset and the final embedding vector of the user by means of a splicing layer of the to-be-trained graph convolutional network model to obtain a spliced vector;

inputting the spliced vector into a fully connected layer of the to-be-trained graph convolutional network model, and outputting a predicted asset value of the target historical asset to the user by means of the fully connected layer;

calculating a loss value based on the predicted asset value and a preset value of the target historical asset to the user; and updating parameters of the to-be-trained graph convolutional network model by using the loss value to obtain the graph convolutional network model.

In some embodiments, the calculating the loss value according to the predicted asset value and the preset value of the target historical asset to the user includes:

calculating the loss value by a following formula:

$$loss = \frac{1}{2}(\text{output} - \text{value})^2 + \frac{\lambda_1}{2}\sum_{r \in R}\|I_r - E^T R E\|_2^2 + \frac{\lambda_2}{2}\left(\|V\|_2^2 + \|E\|_2^2 + \sum_{r \in R}\|R\|_2^2\right);$$

where output represents the predicted asset value, value represents the preset value, $\lambda 1$ and $\lambda 2$ represent hyperparameters, r represents a relationship embedding vector, R represents a relationship matrix, I represents a quality of a triplet, and E represents an entity matrix in the asset knowledge group, V represents the parameters of the to-be-trained graph convolutional network model.

In the third aspect, an embodiment of the present disclosure also provides an asset value evaluation apparatus, including:

a first memory and a first processor;

where the first memory is configured to store computer programs; and the first processor is configured to execute the computer programs in the first memory to perform following steps:

obtaining input asset value query information for a user;

when determining historical asset interaction information of the user exists, determining an asset set queried by using the asset value query information, where the asset set includes at least one asset;

performing an embedding representation for each asset in the asset set, and determining an asset embedding vector of each asset, where the asset embedding vector is obtained by training based on a relationship between each asset and asset attribute, and the asset attribute is configured to characterize an intrinsic parameter of the asset; and obtaining a value of each asset to the user by inputting the asset embedding vector of each asset into a graph convolutional network model.

In the fourth aspect, an embodiment of the present disclosure also provides a model training apparatus, which includes:

a second memory and a second processor;

where the second memory is configured to store computer programs; and the second processor is configured to execute the computer programs in the second memory to perform following steps:

obtaining historical asset interaction information of a user;

determining a historical asset set having an interaction event with the user according to the historical asset interaction information, where the historical asset set includes at least one historical asset;

making an embedding representation for each historical asset in the historical asset set, and determining an asset embedding vector of each historical asset, where the asset embedding vector of each historical asset is obtained by training based on a relationship between each historical asset and an asset attribute, and the asset attribute is configured to characterize an inherent parameter of each historical asset; and inputting the asset embedding vector of each historical asset into a to-be-trained graph convolutional network model, and performing training on the to-be-trained graph convolutional network model to obtain a graph convolutional network model.

In the fifth aspect, an embodiment of the present disclosure further provides a computer-readable storage medium, where:

computer instructions which is stored in the computer readable storage medium, when the computer instructions are run on a computer, causes the computer to execute the asset value evaluation method described above or the model training method described above.

DETAILED DESCRIPTION

Figure 1:
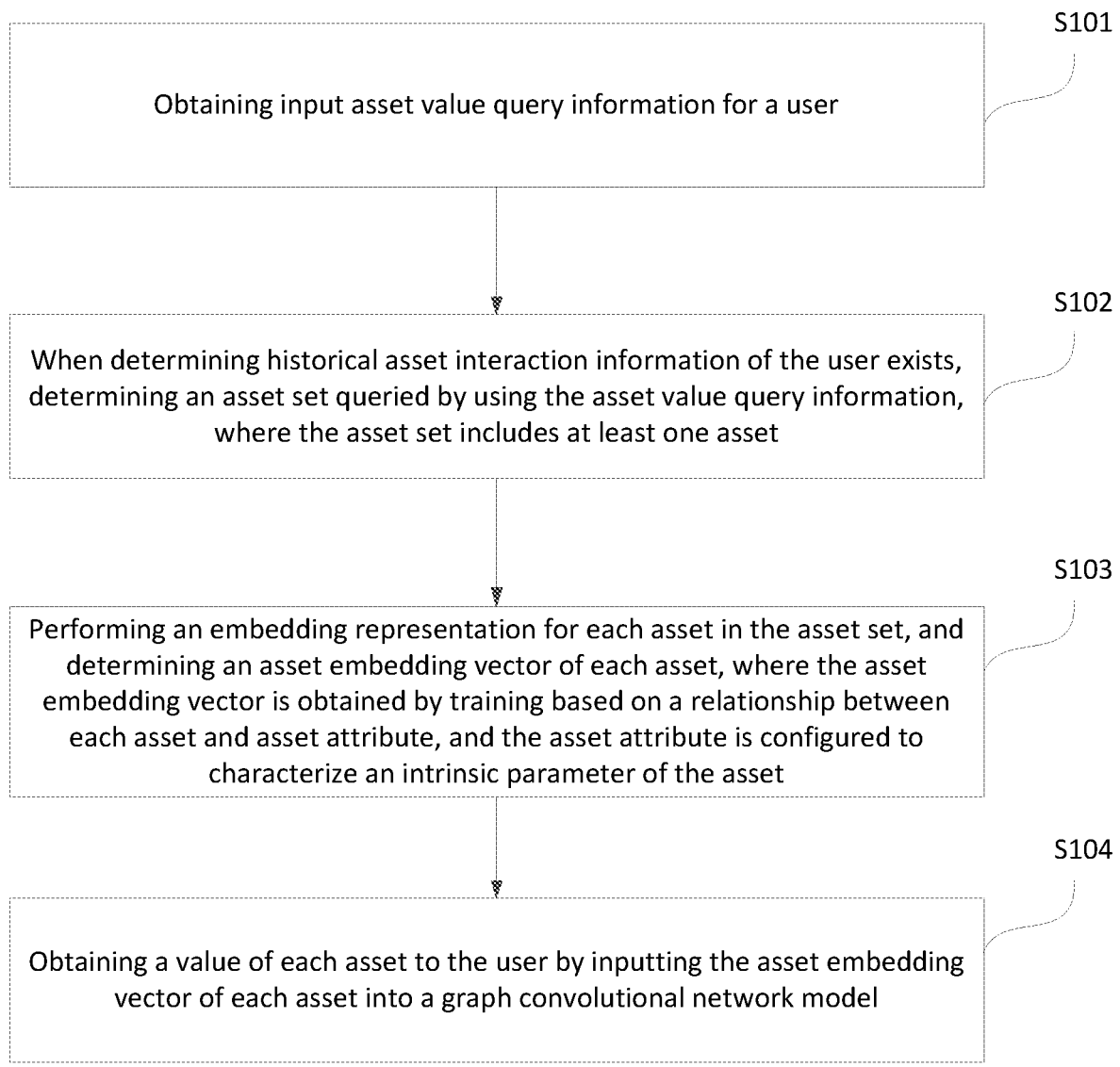
FIG. 1 is a method flow chart of an asset value evaluation method provided by embodiments of the present disclosure.

In order to make the purpose, technical solutions and advantages of embodiments of the present disclosure clearer, the technical solutions of embodiments of the present disclosure will be clearly and completely described below in conjunction with the accompanying drawings of embodiments of the present disclosure. Apparently, the described embodiments are some of embodiments of the present disclosure, not all of them. And in the case of no conflict, embodiments in the present disclosure and the features in the embodiments can be combined with each other. Based on the described embodiments of the present disclosure, all other embodiments obtained by persons of ordinary skill in the art without creative effort fall within the protection scope of the present disclosure.

Unless otherwise defined, the technical terms or scientific terms used in the present disclosure shall have the usual meanings understood by those skilled in the art to which the present disclosure belongs. The words "comprising" or "including" and similar words used in the present disclosure mean that the elements or objects appearing before the word include the elements or objects listed after the word and their equivalents, without excluding other elements or objects.

It should be noted that the size and shape of each figure in the drawings do not reflect the true scale, but are only intended to illustrate the present disclosure. And the same or similar reference numerals represent the same or similar elements or elements having the same or similar functions throughout.

In related art, it is mainly based on fixed indicators and dimensions, combined with manual or machine learning to evaluate the values of assets such as commodities and patents, etc. However, the manual mode is subjective, and the fixed indicators and dimensions cannot be personalized for different users, are even unable to reflect the relationship between indicators, the value evaluation results are poor. It can be seen that there is an existing technical problem of the low accuracy in the asset value evaluation.

In view of this, the embodiments of the present disclosure provide an asset value evaluation method and apparatus, a model training method and apparatus, and a readable storage medium.

As shown in FIG. 1, a method flowchart of an asset value evaluation method is provided by embodiments of the present disclosure. The asset value evaluation method can be applied to an asset value evaluation system, and the asset value evaluation system can realize the evaluation of intangible assets, such as patents, papers, trademarks, etc., and tangible assets, such as mobile phones, laptops, air conditioners, TVs, etc. The asset value evaluation method includes the following steps.

S101: obtaining input asset value query information for a user.

For example, when evaluating the value of a mobile phone, the asset value query information can be the model, serial number, etc. of the mobile phone; when evaluating the value of a patent, the asset value query information can also be the patent application number, IPC classification number, etc.; when the user is a company, the asset value query information can further include the user's identification number, such as the company organization code, company name, etc.; and when the user is an individual, the asset value query information may also include the user's name, ID number, etc. Of course, the asset value query information can also be set according to actual application needs, which is not limited here. The user may be an individual or a company, which is not limited here.

In some embodiments, the step S101: obtaining the input asset value query information for the user, includes:

obtaining input user information configured to characterize the user and a to-be-evaluated asset set, to cause that the graph convolutional network model outputs a value of each to-be-evaluated asset in the to-be-evaluated asset set to the user.

In one of the application scenarios of the embodiments of the present disclosure, the user information configured to characterize the user and the to-be-evaluated asset set can be input into the asset value evaluation system. When the to-be-evaluated asset is a patent, the patent application number, IPC classification number, etc., of the patent can be input, when the to-be-evaluated asset is a mobile phone, the model, serial number, etc. of the mobile phone can also input, when the user is a company, the user information characterizing the user can be the organization code, company name, etc., and when the user is an individual, the user information characterizing the user may be a person's name, ID number, etc. In this way, not only the evaluation of personal asset value can be realized, but also the evaluation of company asset value can be realized. Of course, the asset value of other objects, such as the school, family, etc., which is not limited here, can also be evaluated according to actual application needs. As a specific example, a user 1 and the to-be-evaluated asset set including asset 1, asset 2, and asset 3 input into the asset value evaluation system to determine the values of asset 1, asset 2, and asset 3 on user 1.

In some embodiments, step S101: obtaining the input asset value query information for the user includes:

obtaining input user information configured to characterize the user, to cause that the graph convolutional network model outputs at least one asset whose value to the user meets a preset value.

In another application scenario of the embodiment of the present disclosure, only the user information configured to characterize the user may be input into the asset value evaluation system. For example, when the user is a company, the corresponding organization code, company name, etc., may be input, when the user is an individual, the corresponding name, ID number, etc., may be input. As a specific example, the organization code of the user 2 is input into the asset value evaluation system to determine the value of each asset to the user 2 from the historical asset set in the asset value evaluation system. In addition, the number of assets to be screened can also be input into the asset value evaluation system. After the value of each asset to the user is determined, the assets of the corresponding number of assets can be screened out, for example, after inputting 100 to-be-evaluated assets for value evaluation, the number of assets to be screened is set to be 10. In this way, after evaluating the values of 100 to-be-evaluated assets, 10 assets with higher value to the user can be selected from the 100 to-be-evaluated assets, so as to achieve a specific number of asset recommendations for the user.

Of course, in addition to the application scenarios mentioned above, the asset value evaluation method in embodiments of the present disclosure can also be applied to other scenarios, which will not be described in detail here.

S102: when determining historical asset interaction information of the user exists, determining an asset set queried by using the asset value query information, where the asset set includes at least one asset.

When it is determined that the historical asset interaction information of the user exists, the user is a user who has historical interaction events such as application, purchase, and transfer of related assets, and it can be determined that the asset set is obtained by querying the asset value query information. The asset set may include one asset, or multiple assets. The multiple assets may all be tangible assets, or all may be intangible assets, or may include both tangible assets and intangible assets, which is not limited here.

S103: performing an embedding representation for each asset in the asset set, and determining an asset embedding vector of each asset, where the asset embedding vector is obtained by training based on a relationship between each asset and asset attribute, and the asset attribute is configured to characterize an intrinsic parameter of the asset.

The embedding representation is performed for each asset, the asset embedding vector of each asset is determined, the asset embedding vector of each asset is obtained by training based on the relationship between each asset and the asset attribute, and the asset attribute is configured to characterize an inherent parameter of each historical asset. For example, the asset is a patent, and its corresponding asset attribute include the number of claims, number of times involved in litigation, patent publication number, patent application number, classification number, legal status, etc. For another example, the asset is a mobile phone, and its corresponding asset attribute include the image resolution, screen size, etc. Since the asset embedding vector of each asset is obtained by training based on the relationship between each asset and the asset attribute, and the asset is the entity in nature, the asset embedding vector not only integrates the entity corresponding to the asset itself and also integrates the relationship between the asset and the asset attribute of the asset itself. In this way, after the queried asset of the user is determined, not only the entity information of the asset can be determined, but also the asset attribute information related to the asset can be determined, so that the relevant information of the asset can be determined more accurately.

S104: obtaining a value of each asset to the user by inputting the asset embedding vector of each asset into a graph convolutional network model.

The graph convolutional network model may be a RippleNet model, a knowledge graph convolutional network (KGCN) model, or a graph attention network (GAT) model, which is not limited here. The value of each asset to the user can be obtained by inputting the asset embedding vector of each asset into the graph convolutional network model. Since the asset embedding vector input into the graph convolutional network model is obtained by training based on the relationship between the entity and asset attribute of each asset, the asset embedding vector integrates the relationship between the asset and the asset attribute of the asset itself. After the queried asset of the user, not only the entity information of the asset can be determined, but also the asset attribute information related to the asset can be determined. After the asset embedding vector of each asset is input into the graph convolutional network model, the relationship between the asset and the user can be more accurately determined, thereby improving the accuracy of asset value evaluation.

Figure 2:
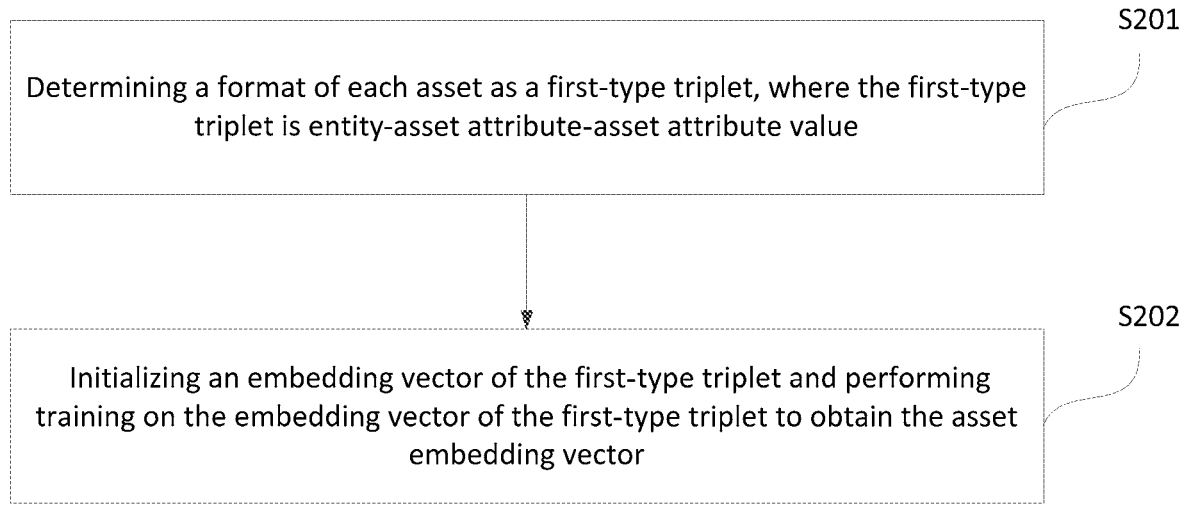
FIG. 2 is a method flowchart of a training process based on a relationship between an asset and an asset attribute of each asset in a step S103 in FIG. 1.

In the embodiment of the present disclosure, in order to realize the determination of the asset embedding vector of each asset, as shown in FIG. 2, in step S103: a training process based on the relationship between the asset and the asset attribute includes:

S201: determining a format of each asset as a first-type triplet, where the first-type triplet is entity-asset attribute-asset attribute value; and S202: initializing an embedding vector of the first-type triplet and performing training on the embedding vector of the first-type triplet to obtain the asset embedding vector.

In some embodiments, the detailed implementation of the step S201 to step S202 is as follows.

First, the first-type triplet in the format that is entity-asset attribute-asset attribute value in each asset is determined, and the format of the first-type triplet can be expressed as (h,a,a_value), where h represents an entity in the first-type triplet, a represents an asset attribute in the first-type triplet, and a_value represents an asset attribute value in the first-type triplet. For example, for the triplet (patent 1, legal status, public), "patent 1" means the entity, "legal status" means the asset attribute, and "public" means the asset attribute value. For another example, for the triplet (patent 1, number of claims, 30), "patent 1" represents the entity, "number of claims" represents the asset attribute, and "30" represents the "asset attribute value". Yet for another example, for the triplet (patent 1, number of times involved in litigation, 5), "patent 1" represents the entity, "number of times involved in litigation" represents the asset attribute, and "5" represents the "asset attribute value". Of course, the first-type triplet of the asset may also be constructed according to actual application needs, and no further examples are given here. In some embodiments, the first-type triplet can be constructed based on the asset attributes that have a greater impact on the asset value. For example, the "legal status", "number of claims" and "number of times involved in litigation" of patents often have a greater impact on the values of patents. By constructing the first-type triplet including the asset attribute, the asset attribute value corresponding to the asset attribute of the asset itself is fully considered, so that the value of the corresponding patent can be accurately determined. Based on the same realization principle, by means of the construction of the first-type triplet, the accuracy of asset value evaluation can be improved.

Then, the embedding vector of the first-type triplet is initialized and trained to obtain the asset embedding vector. Since the constructed the first-type triplet fully consider the asset attribute value corresponding to the asset attribute of the asset itself, after the embedding vector of the first-type triplet is initialized and trained, for the obtained asset embedding vector, the relationship between the entity corresponding to the asset and the inherent asset attribute of the entity itself are fully considered. In this case, the graph convolutional network model can evaluate the asset value of the user from the two dimensions of entity and asset attribute, which improves the accuracy of asset evaluation.

In the embodiment of the present disclosure, in order to obtain the initialization embedding vector of the first-type triplet, the initializing the embedding vector of the first-type triplet in step S202 includes:

encoding the first-type triplet by means of a Bi-LSTM network to obtain an initialization embedding vector of the first-type triplet.

In some embodiments, the first-type triplet can be encoded by means of a bidirectional long-short-term memory (Bi-LSTM) network, and the entity, asset attribute and asset attribute value of the first-type triplet can be respectively initialized and encoded by the Bi-LSTM network. Alternatively, the embedding representation are performed on the entity and asset attribute in the first-type triplet by the random initialization manner, the asset attribute value of the first-type triplet is initialized and coded by means of the Bi-LSTM network, so as to obtain the initialization embedding vector of the first-type triplet. After obtaining the initialization embedding vector of the first-type triplet, the first-type triplet can be trained by means of the graph embedding translate model to obtain the corresponding asset embedding vector. For the specific training process, please refer to the description as below. In some embodiments of the present disclosure, the graph embedding translate model may be a TransH model, a TransR model, or a TransE model. It should be noted that performing embedding representation for the entity and the asset attribute is essentially a process of converting the text into the vector.

Figure 3:
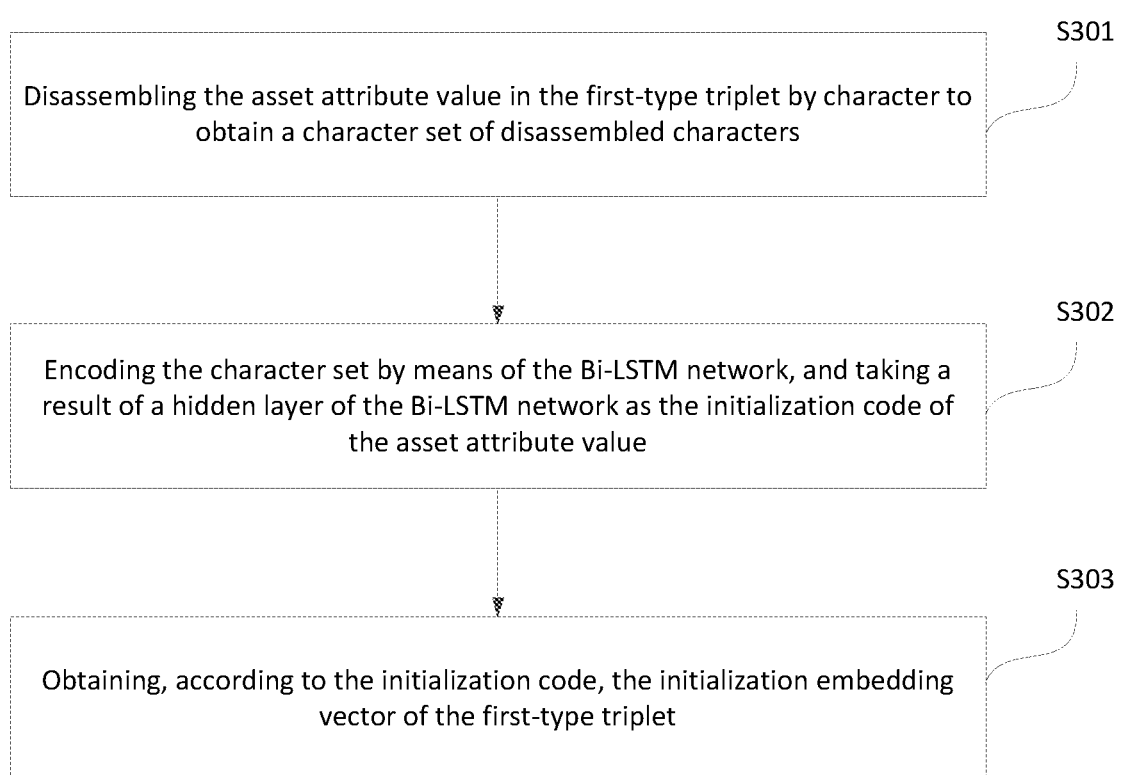
FIG. 3 is a method flowchart of a step S202 in FIG. 2.

In the embodiment of the present disclosure, as shown in FIG. 3, the step of encoding the first-type triplet by means of the Bi-LSTM network to obtain the initialization embedding vector of the first-type triplet, includes:

S301: disassembling the asset attribute value in the first-type triplet by character to obtain a character set of disassembled characters;

S302: encoding the character set by means of the Bi-LSTM network, and taking a result of a hidden layer of the Bi-LSTM network as the initialization code of the asset attribute value;

S303: obtaining, according to the initialization code, the initialization embedding vector of the first-type triplet.

In some embodiments, the specific implementation process of step S301 to step S303 is as follows.

First, the asset attribute value in the first-type triplet is determined, the asset attribute value in the first-type triplet is disassembled into multiple characters by character, and the character set of disassembled characters is obtained. For example, the asset attribute value includes m number of characters, m is a positive integer, and the character set can be expressed as: $C=\{c_1, c_2, c_3, \ldots, c_m\}$. Then, the character set is encoded by means of the Bi-LSTM network, and the result of the hidden layer in the Bi-LSTM network is taken as the initialization code of the asset attribute value, and then, the initialization embedding vector of the asset attribute value is determined according to the initialization code. At this time, after performing the embedding representation on the entity and asset attribute in the first-type triplet by the random initialization manner, the entity and asset attribute of the first-type triplet can be determined. Then, the initialization embedding vector of the first-type triplet is obtained according to the initialization embedding vector of the entity, asset attribute and asset attribute value in the first-type triplet.

It should be noted that the parameter values (that is, asset attribute values) corresponding to the asset attributes of different assets can be in many situations. For example, the later disclosed patent will be assigned with a publication number different from that of the earlier disclosed patent, so that it is impossible to exhaustively list the publication numbers for a situation where the asset attribute value is the publication number. For another example, the serial numbers of the same products sold in the same supermarket are often different. That is to say, the asset attribute value(s) in the first-type triplet can be regarded as approximately infinite-dimensional which is often difficult to be trained, and it is impossible to use the random initialization method for training. In the embodiment of the present disclosure, the character set obtained by performing character disassembling on the first-type triplet by character is encoded by the Bi-LSTM network. On the one hand, after disassembling the asset attribute value by character, each character is finite dimensional, which can be encoded to avoid the problem of difficult to initialize vectors. On the other hand, in the process of performing embedding for a single character by means of the Bi-LSTM network, the relationship between the character and the preceding and following characters is fully considered, thus ensuring that the initialization vector trained by the Bi-LSTM network can still expresses the meaning of the asset attribute value itself before the character disassembling, which ensures the accuracy of the asset embedding vector.

Figure 4:
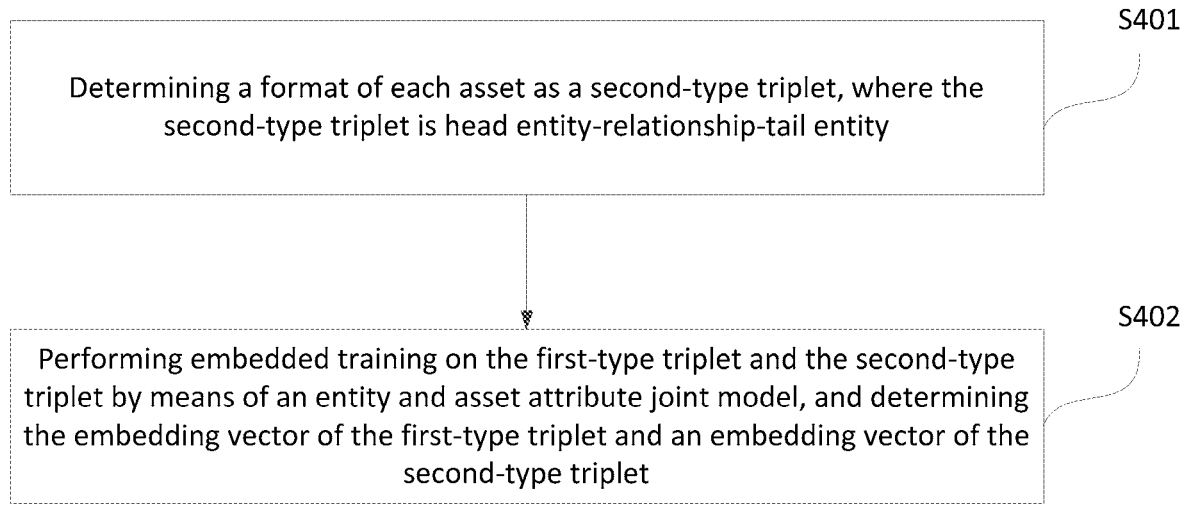
FIG. 4 is another method flowchart of a training process based on a relationship between an asset and an asset attribute of each asset in a step S103 in FIG. 1.

In the embodiment of the present disclosure, in order to further improve the accuracy of the asset embedding vector, thereby more accurately determining the association between the asset and the user, and thereby improving the accuracy of the asset value evaluation, as shown in FIG. 4, in the step S103, a training process based on the relationship between each of the asset and the asset attribute further includes:

S401: determining a format of each asset as a second-type triplet, where the second-type triplet is head entity-relationship-tail entity; and S402: performing embedded training on the first-type triplet and the second-type triplet by means of an entity and asset attribute joint model, and determining the embedding vector of the first-type triplet and an embedding vector of the second-type triplet.

In some embodiments, the specific implementation process of step S401 to step S402 is as follows.

In the training process based on the relationship between each asset and asset attribute, in addition to determining the first-type triplet for each asset, it is also necessary to determine that the second-type triplet in the format that is head entity-relationship-tail entity in each asset. In this way, while considering the relationship between the asset and its own asset attribute, the relationship between the asset and other entities is also considered. In this way, after obtaining the asset embedding vector, a more accurate value evaluation can be obtained. The format of the second-type triplet, and r represents the relationship in the second-type triplet, t represents the tail entity in the second-type triplet. For example, for patent 2, in (patent 2, belongs to, company D), "patent 2" and "company D" represent entities, and "belongs to" represents a relationship.

Then, embedded training is performed on the first-type triplet and the second-type triplet by means of an entity and asset attribute joint model, and the embedding vector of the first-type triplet and an embedding vector of the second-type triplet are determined. It should be noted that during the process of joint training for the first-type triplet and the second-type triplet by means of the entity and asset attribute joint model, the entity in the first-type triplet and the entity in the second-type triplet are the same one entity. The first-type triplet and the second-type triplet are trained by means of the entity and asset attribute joint mode to obtain embedding vectors of corresponding triplets, and based on this, the asset embedding vector of the asset can be determined. For the first-type triplet, the embedding vector obtained by training by means of the entity and asset attribute joint model fully integrates the relationship between the asset and its own asset attribute. For the second-type triplet, the embedding vector obtained by training by means of the entity and asset attribute joint model fully integrates the relationship between the asset and other entities. In this way, the asset embedding vectors obtained by means of the first-type triplet and the second-type triplet not only integrates the relationship between the assets and asset attributes, but also integrates the relationship between assets and other entities, thus improving the accuracy of asset value evaluation based on the asset embedding vectors.

It should be noted that, during the embedded training process of the first-type triplet and the second-type triplet by means of the entity and asset attribute joint model, the loss function of the first-type triplet and the loss function of the second-type triplet can be respectively determined, and then the joint training is performed according to the loss functions of the two parts. The specific joint training process can refer to the description of the relevant content below.

Figure 5:
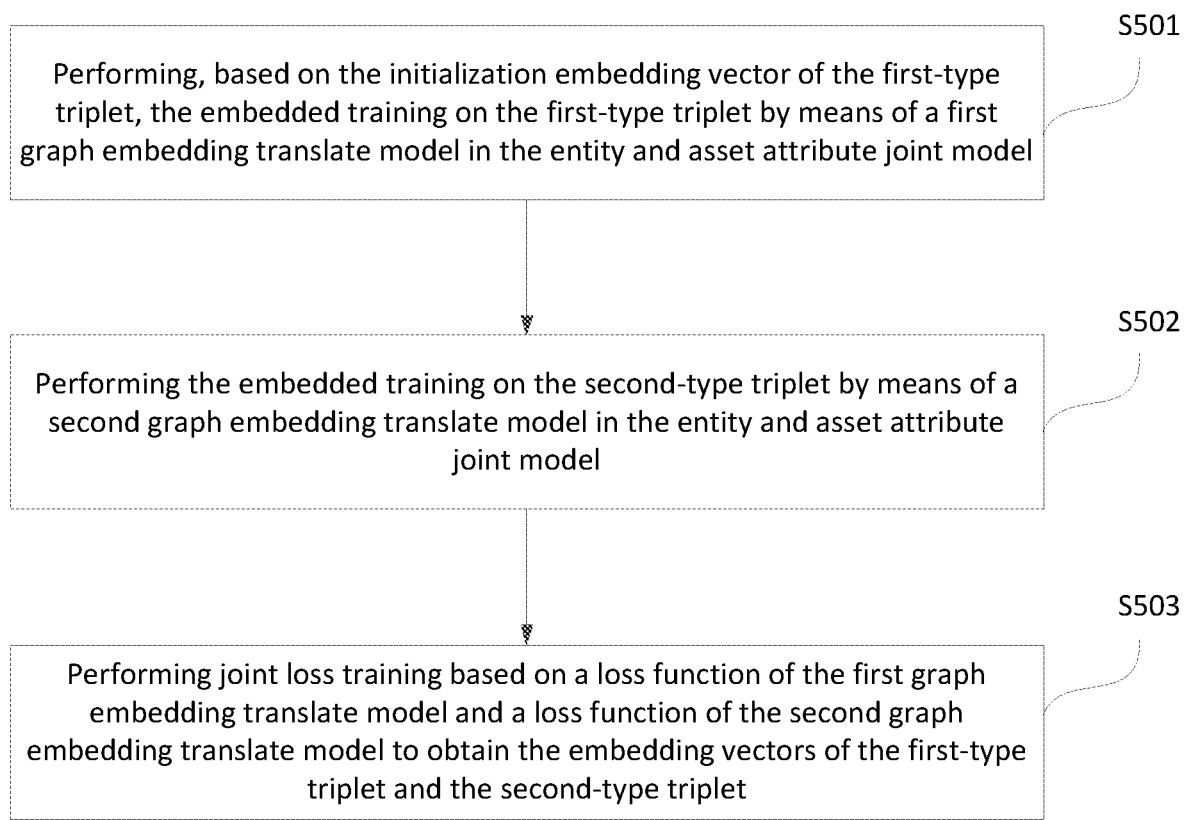
FIG. 5 is a method flowchart of a step S402 in FIG. 4.

In the embodiment of the present disclosure, the entity and asset attribute joint model can be a pre-built model based on the Bi LSTM network and graph embedding Translate model. As shown in FIG. 5, the operations of step S402, the performing the embedded training on the first-type triplet and the second-type triplet by means of the entity and asset attribute joint model, and determining the embedding vector of the first-type triplet and the embedding vector of the second-type triplet includes:

S501: performing, based on the initialization embedding vector of the first-type triplet, the embedded training on the first-type triplet by means of a first graph embedding translate model in the entity and asset attribute joint model;

S502: performing the embedded training on the second-type triplet by means of a second graph embedding translate model in the entity and asset attribute joint model; and S503: performing joint loss training based on a loss function of the first graph embedding translate model and a loss function of the second graph embedding translate model to obtain the embedding vectors of the first-type triplet and the second-type triplet.

Figure 6:
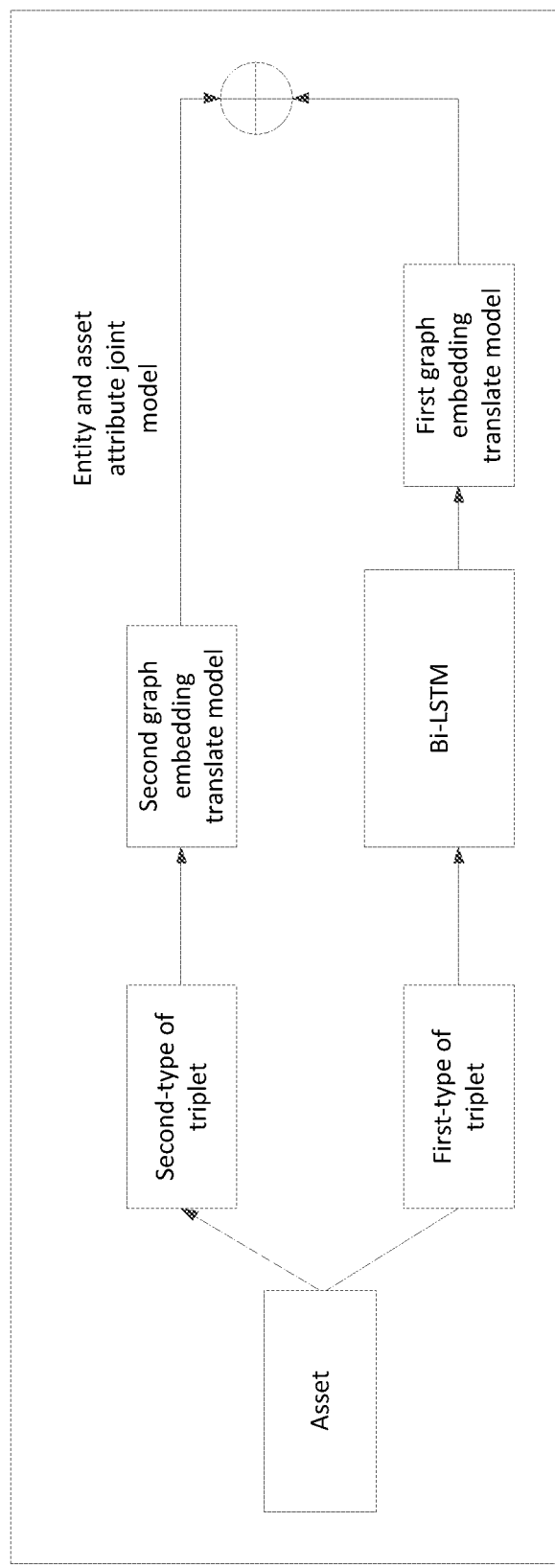
FIG. 6 is a schematic structural diagram of an entity and asset attribute joint model in an asset value evaluation method provided by embodiments of the present disclosure.

In some embodiments, the specific implementation process from step S501 to step S503 will be described in combination with the entity and asset attribute joint model shown in FIG. 6.

Before determining the asset embedding vector of each asset, firstly, the embedded training is performed on the first-type of triplet by means of the first graph embedding translate model in the entity and asset attribute joint model based on the initialization embedding vector of the first-type triplet. After the initialization code of the asset attribute value in the first-type triplet is determined by the Bi-LSTM network, for the first-type of triplet, the first graph embedding translate model is configured to train the first-type triplet. The embedding representation are performed on the entity and asset attribute in the first-type triplet by the random initialization manner, then the embedding vectors of the entity and the asset attribute in the first-type triplet are respectively obtained, and then the embedding vectors of the entity, the asset attribute, and the asset attribute value in the first-type triplet are trained by means of the first graph embedding translate model. The loss function for training the first-type triplet by means of the first graph embedding translate model is:

$$\text{Loss}(a) = \sum_{h,a,v \in T_a} \sum_{h',a,v' \in T'_a} \max(0, (\gamma + (f(h_a, v) - f(h'_a, v')))).$$

The embedded training may be performed on the second-type triplet by means of a second graph embedding translate model in the entity and asset attribute joint model. For the second-type triplet, the first-type triplet is trained by means of the second graph embedding translate model, and the training method is shown as follows.

First, the head entity and the tail entity in the second-type triplet are respectively mapped to a hyperplane w, and the mapped head entity $h_1$ and the mapped tail entity $t_1$ obtained are represented by the following formula:

$$h_\perp = h - w_r^T h w_r, \; t_\perp = t - w_r^T h w_r.$$

Then, this makes the mapped head entity vector plus the relationship vector more approximate to the tail entity vector to obtain the difference representation of the second-type triplet:

$$f_r(h, t) = \left\|(h - w_r^T h w_r) + d_r - (t - w_r^T t w_r)\right\|_2^2.$$

The loss function for training the second-type triplet is:

$$\text{Loss}(e) = \sum_{(h,r,t) \in \Delta} \sum_{(h',r',t') \in \Delta'_{(h,r,t)}} \left[f_r(h, t) + \gamma - f^{r'}(h', t')\right]_+.$$

Where, Δ represents a positive sample triplet in the second-type triplet, and Δ' represents a negative sample triplet, and the negative sample triplet is generated by randomly replacing the head entity or the tail entity with the original triplet.

In addition, the similarity between the entity in the first-type triplet and the entity in the second-type triplet is:

$$\text{Loss}(sim) = \sum_{e,a \in H} [1 - \cos(h_e, h_a)].$$

In the process of jointly training the first-type triplet and the second-type triplet by means of the entity and asset attribute joint model, the entity in the first-type triplet and the entity in the second-type triplet are the same entity, such that the final loss function for training the entity and asset attribute joint mode can be expressed as:

$$\text{Loss} = \text{Loss}(e) + \text{Loss}(a) + \text{Loss}(sim).$$

In some embodiments, the joint loss training is performed based on a loss function of the first graph embedding translate model and a loss function of the second graph embedding translate model to obtain the embedding vectors of the first-type triplet and the second-type triplet. The first-type triplet and the second-type triplet are trained by means of the entity and asset attribute joint model, so that the obtained embedding vector of the first-type triplet can better represent the asset attribute value between the asset and its own asset attribute, and the embedding vector of the second-type of triplet can better represent the relationship between the asset and other entities, e.g., the relationship between the head entity and tail entity where the asset is located, which ensures that the obtained asset embedding vector can better represent the relationship between the asset and its own asset attribute and the relationship between the asset and other entities, and provides a sufficient guarantee for the subsequent asset value evaluation based on the asset embedding vector.

In some embodiments of the present disclosure, the first graph embedding translate model and the second graph embedding translate model each may be a TransH model, a TransR model, or a TransE model.

In the embodiment of the present disclosure, the first-type triplet and the second-type triplet can be obtained according to a pre-constructed asset knowledge group. Specifically, in step S101: before the obtaining the input asset value query information for the user, the method further includes:

constructing an asset knowledge graph, where the asset knowledge graph includes multiple first-type triplets in a format that is entity-asset attribute-asset attribute value and multiple second-type triplets in a format that is head entity-relationship-tail entity.

For the construction process of the asset knowledge group, the asset attribute that affects the asset value may be determined based on prior experience. Taking the asset as the patent as an example, the correspondence table between the entity corresponding to the asset and the asset attribute of the entity that affects the asset value can be as shown in Table 1. Of course, the asset attributes can also be set according to actual application needs, which is not limited here. Then, according to the asset attribute, a preset graph construction strategy is designed. By means of the preset graph construction strategy, the entity and the asset attribute corresponding to the entity can be added or deleted according to the actual need, thus ensuring the flexibility of constructing the asset knowledge group. Then, the data in the preset asset database is parsed according to the preset graph construction strategy, and the asset data parsed is obtained. Then, the parsed asset data can be imported into a graph database, and the graph database can be neo4j, thereby realizing the construction of the asset knowledge graph. The asset knowledge graph includes multiple first-type triplets in the format of entity-asset attribute-asset attribute value and multiple second-type triplets in the format of head entity-relationship-tail entity. The specific number of the first-type triplets and the specific number of the second-type triplet may be determined according to practical applications, and are not limited here.

TABLE 1

| Entity | Asset attribute |
| --- | --- |
| Author | Author name, author ID, and whether first author |
| Pantent | Number of claims, number of words of first claim, agency, country of application, number of times involved in litigation, patent type, publication date, number of transactions, patent publication number, abstract, technical keywords, date of application, current legal status, subject matter of a field to which it belongs, and patent title |
| IPC classification number | Classification number, and subject matter of classification |
| Application event | Whether first applicant, application date, and application event ID |
| Transfer event | Transfer date and transfer event ID |
| Company/organization | ID, main business, category |
| Standardization institution | Name and standardization ID |
| Patent litigation event | Litigation type and appeal decision |

Figure 7:
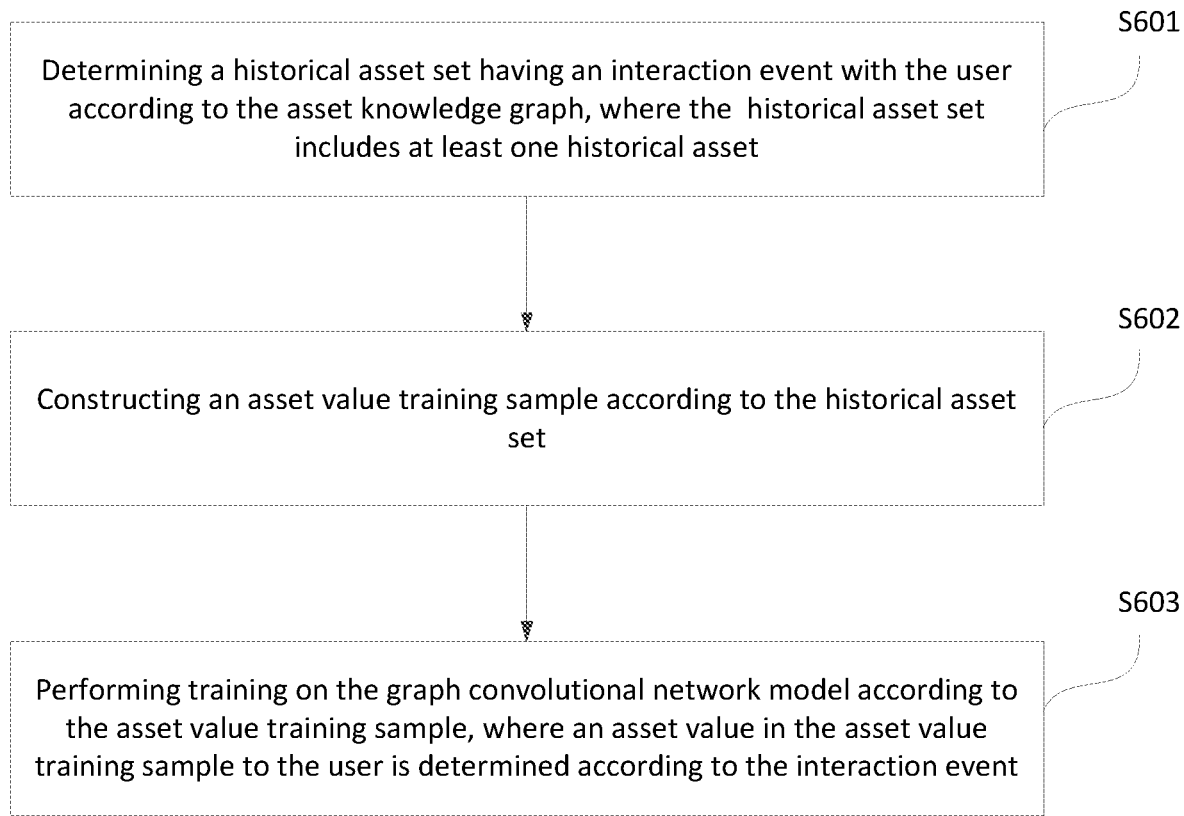
FIG. 7 is a flow chart of one of methods before a step S101 in FIG. 1.

In the embodiment of the present disclosure, before evaluating the asset value by means of the graph convolutional network model, it is also necessary to pre-construct asset value training samples to train the graph convolutional network model to ensure the accuracy of the asset value evaluation result. As shown in FIG. 7, in step S101: before the obtaining the input asset value query information for the user, the method further includes:

S601: determining a historical asset set having an interaction event with the user according to the asset knowledge graph, where the historical asset set includes at least one historical asset;

S602: constructing an asset value training sample according to the historical asset set; and

S603: performing training on the graph convolutional network model according to the asset value training sample, where an asset value in the asset value training sample to the user is determined according to the interaction event.

In some embodiments, the specific implementation process of step S601 to step S603 is as follows.

Before obtaining the input asset value query information for the user, it may be to obtain the historical asset interaction information of the user, which may be determined according to the historical interaction record(s) of the user collected in the asset value evaluation system. The historical asset interaction information of the user is determined according to the historical interaction record(s), and then, a historical asset set that has the interaction event with the user is determined according to the historical asset interaction information and the asset knowledge graph, and the historical asset set includes at least one historical asset, where the interaction event may be the application, purchase, litigation, etc. Then, an asset value training sample is constructed according to the historical asset set, and the asset value to the user in the asset value training sample is determined according to the interaction event. For example, the value corresponding to the interaction event "application" is "8" points, the value corresponding to the interaction event "purchase" is "10" points, and the value corresponding to the interaction event "involved in litigation and won the lawsuit" is "10" points. The format of the asset value training sample can be historical asset-user-value, and the corresponding training sample set can be expressed as: $s_i=\{(P_i, C_i, V_i)|(P, C, V)\in S\}$, $i=1, 2, \ldots, n$, where P represents the historical asset, C represents the user, and V represents the value. The format of the asset value training sample can also be user-historical asset-value, and the corresponding training sample set can be expressed as $s_i=\{(C_i, P_i, V_i)|(C, P, V)\in S\}$, $i=1, 2, \ldots, n$, which is not limited here. Then, the graph convolutional network model is trained according to the asset value training samples, so that the trained graph convolutional network model can be configured to evaluate the values of assets to users accordingly.

It should be noted that, for the situation where the node where the user is located is directly connected to the node where the asset is located in the asset knowledge graph, the value of the asset to the user may be determined according to the corresponding relationship between the interaction event and the asset value. For example, for the situation where the asset is a patent, three indicators "company's application for patent", "patent transaction between companies" and "patent litigation between companies" can be configured to evaluate the value of the patent. It is preset that the asset value when the interaction event is "application" is "8" points, the asset value when the interaction event is "purchase" is "10" points, and the asset value when the interaction event is "involved in litigation and won the lawsuit" is "10".

Figure 8:
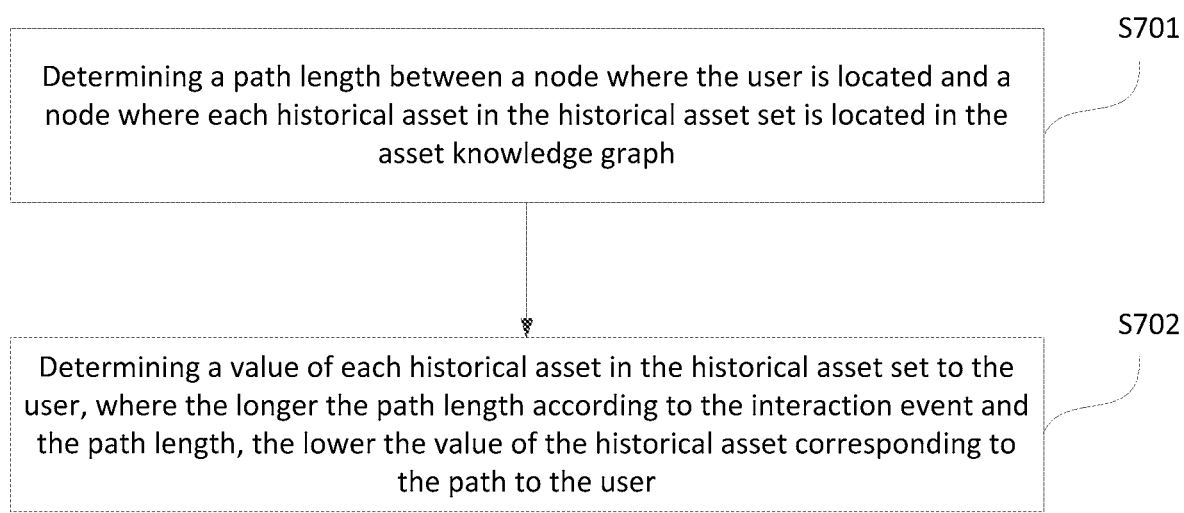
FIG. 8 is a flow chart of one of methods after a step S601 in FIG. 7.

In the embodiment of the present disclosure, in order to realize the calculation of the value of the historical asset to the user, as shown in FIG. 8, in step S601: after determining the historical asset set that has the interaction event with the user, the method further includes:

S701: determining a path length between a node where the user is located and a node where each historical asset in the historical asset set is located in the asset knowledge graph; and S702: determining a value of each historical asset in the historical asset set to the user, where the longer the path length according to the interaction event and the path length, the lower the value of the historical asset corresponding to the path to the user.

In some embodiments, the specific implementation process of step S701 to step S702 is as follows.

Figure 9:
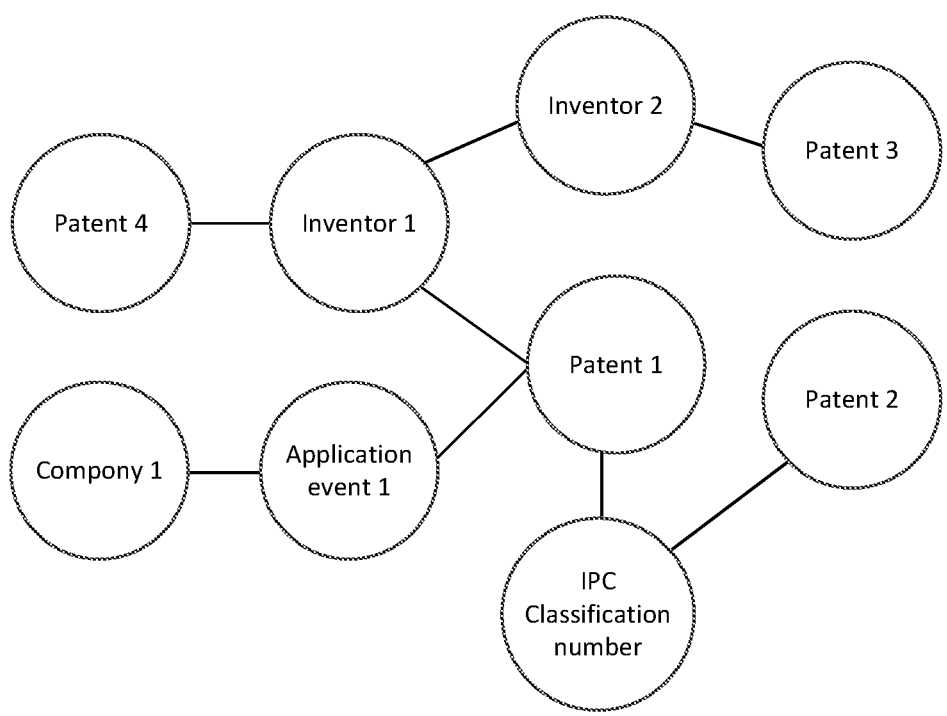
FIG. 9 is a schematic diagram of partial associations in an asset knowledge graph in an asset value evaluation method provided by embodiments of the present disclosure.

After determining the historical asset set that has the interaction event with the user, the path length between the node where the user is located and the node where each historical asset in the historical asset set is located in the asset knowledge graph is determined. It should be noted that the user corresponds to an entity in the asset knowledge graph, and the historical asset corresponds to an entity in the asset knowledge graph. Combined with the partial connection schematic diagram in the asset knowledge graph shown in FIG. 9, "Company 1" can be regarded as a user, and "Patent 1", "Patent 2", "Patent 3" and "Patent 4" can be regarded as historical assets, the path length from "Company 1" to "Patent 1" is 2, the path length from "Company 1" to "Patent 3" is 5, and the path lengths from "Company 1" to "Patent 2" and "Patent 4" are 4. Then, according to the corresponding relationship between the path length and the asset value, the value of each of the historical assets in the historical asset set to the user is determined, where the longer the path length, the lower the value of the historical asset corresponding to the path to the user. Still taking FIG. 9 as an example, as the path length from the patent to the company increases, the value of the patent to the company decreases. Especially for the situation where the node where the user is located is indirectly connected to the node where the asset is located in the asset knowledge graph, the value of the asset to the user can be determined according to the interaction event and the path length.

In the embodiment of the present disclosure, step S702: determining, according to the interaction event and the corresponding relationship between the path length and asset value, the value of each of the historical assets in the historical asset set to the user, includes:

determining the value of each of the historical assets in the historical asset set to the user by using the following formula:

$$V = A^{l-1} basevalue.$$

Where, l represents the path length between the node where the user is located and the node where each historical asset is located in the historical asset set, l is a positive integer, basevalue represents the base value, and A is a constant less than 1.

In some embodiments, if in the asset knowledge graph, the node where the user is located is directly connected to the node where any target historical asset in the historical asset set is located, correspondingly, the path length between the node where the user is located and the node where any target historical asset in the historical asset set is located is 1. In this way, the value of the target historical asset to the user can be V=basevalue. The specific value of basevalue can be determined according to the interaction event between the user and the target historical asset. For example, the asset value of "8" points when the interaction event is "application" can be used as the base value basevalue. Of course, it can also set the basevalue according to the actual application needs, which is not limited here. In addition, the specific value of A may be 0.8 or 0.6, which is not limited here.

Figure 10:
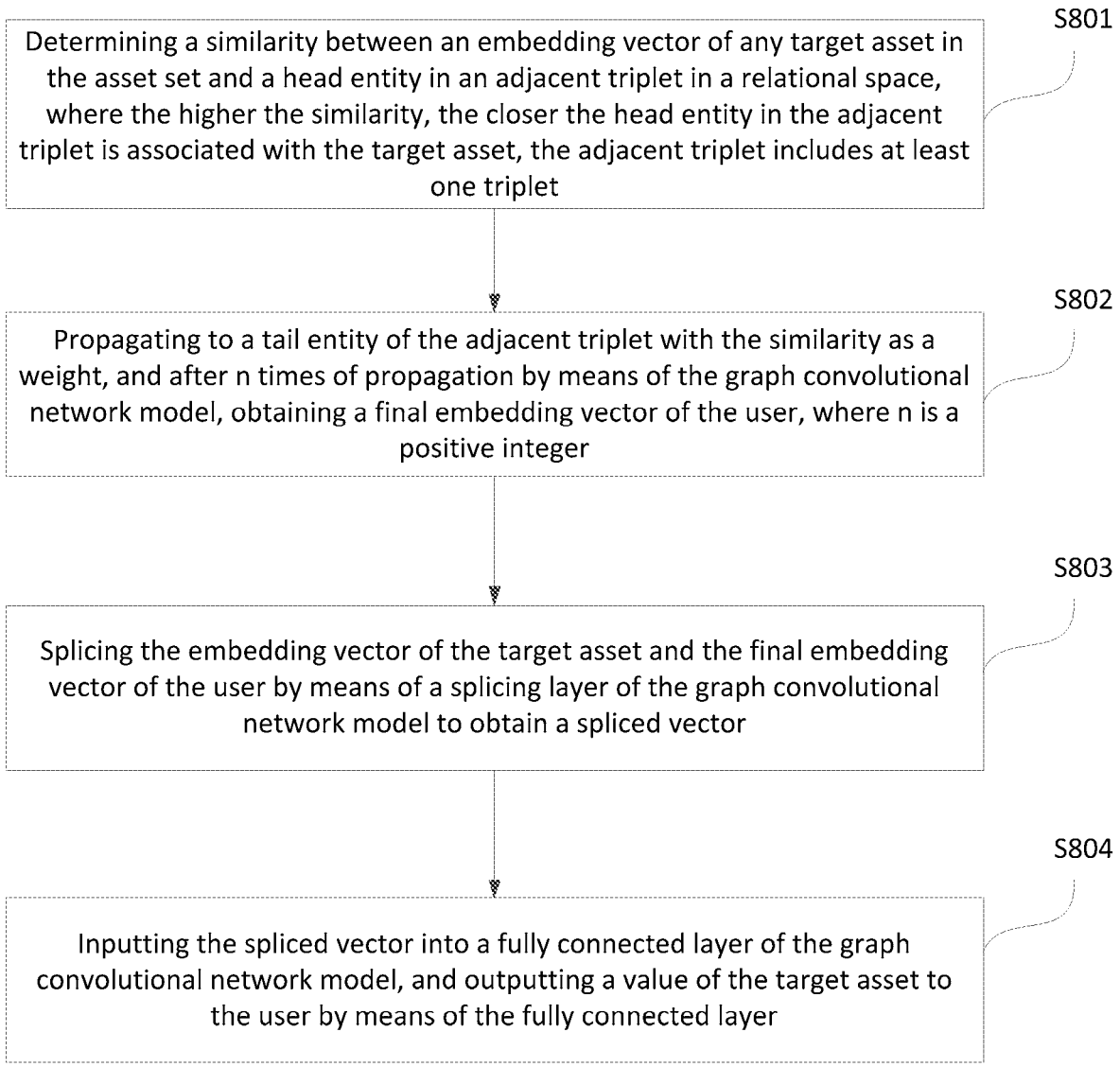
FIG. 10 is a method flowchart of the step S103 in FIG. 1.

In the embodiment of the present disclosure, as shown in FIG. 10, the step S103: obtaining the value of each asset to the user by inputting the asset embedding vector of each asset into the graph convolutional network model, includes:

S801: determining a similarity between an embedding vector of any target asset in the asset set and a head entity in an adjacent triplet in a relational space, where the higher the similarity, the closer the head entity in the adjacent triplet is associated with the target asset, the adjacent triplet includes at least one triplet;

S802: propagating to a tail entity of the adjacent triplet with the similarity as a weight, and after n times of propagation by means of the graph convolutional network model, obtaining a final embedding vector of the user, where n is a positive integer;

S803: splicing the embedding vector of the target asset and the final embedding vector of the user by means of a splicing layer of the graph convolutional network model to obtain a spliced vector; and S804: inputting the spliced vector into a fully connected layer of the graph convolutional network model, and outputting a value of the target asset to the user by means of the fully connected layer.

Figure 11:
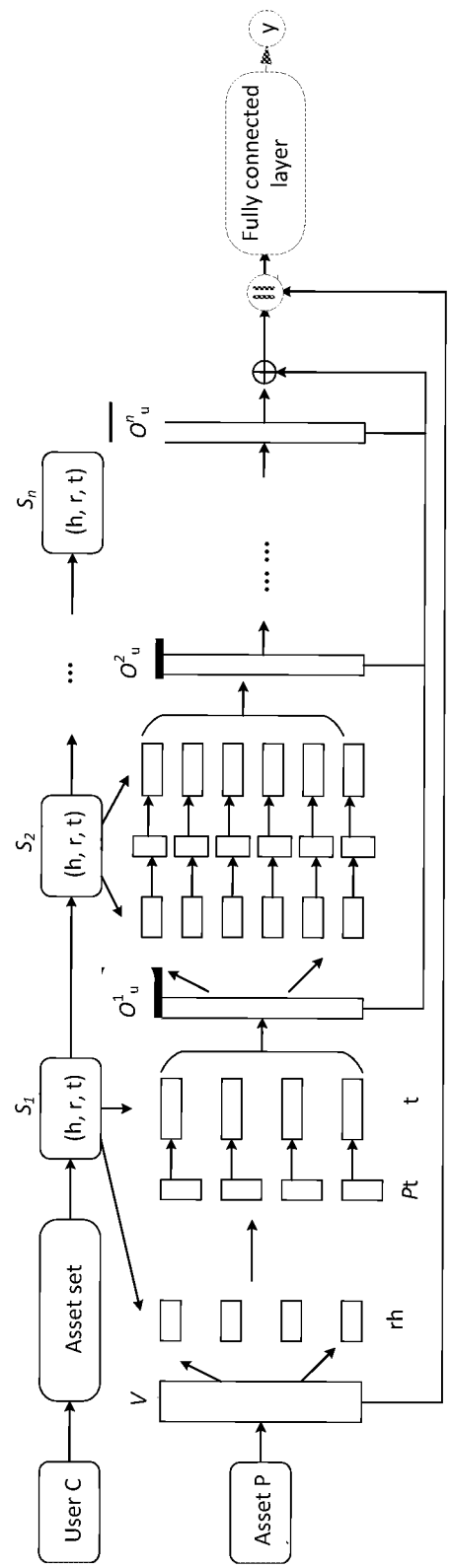
FIG. 11 is a schematic structural diagram of a graph convolutional network model in an asset value evaluation method provided by embodiments of the present disclosure.

In some embodiments, the graph convolutional network model may be a model based on the RippleNet network. In combination with the model structure shown in FIG. 11, the specific implementation process from step S801 to step S804 is explained.

Figure 12:
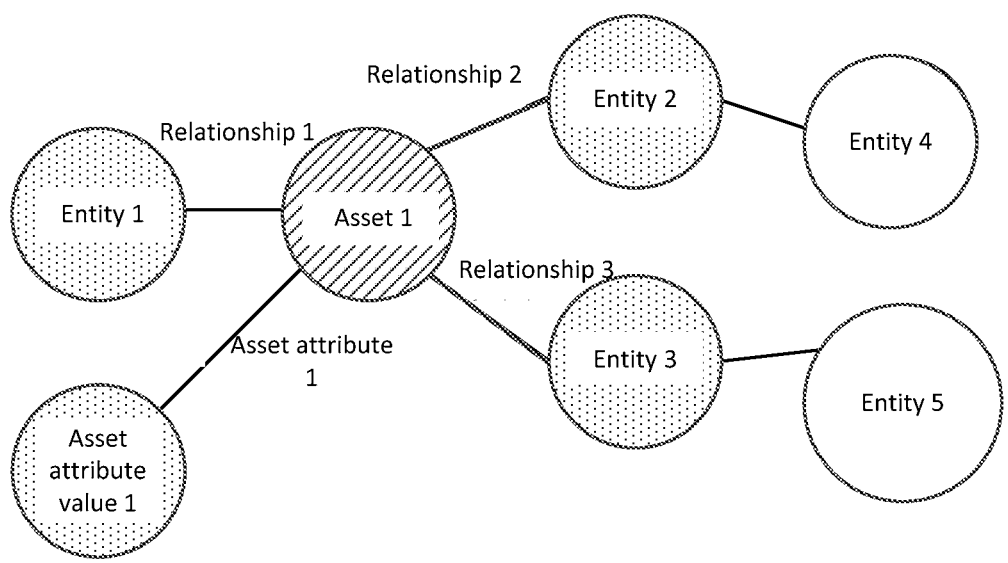
FIG. 12 is a schematic structural diagram of one hop in an asset value evaluation method provided by embodiments of the present disclosure.

First, a similarity between an embedding vector of any target asset in the asset set and a head entity in an adjacent triplet in a relational space is determined, where the higher the similarity, the closer the head entity in the adjacent triplet is associated with the target asset, the adjacent triplet includes at least one triplet. A complete triplet, which is called a hop, takes the target asset as the head entity h, and starts from the head entity h to search for the relationship r and the tail entity t. Combined with the schematic diagram of hop shown in FIG. 12, the adjacent triplets (i.e., the initial hop triplets) of the asset 1 include four triplets, which are asset 1—relationship 1—entity 1, asset 1—relationship 2—entity 2, asset 1—relationship 3—entity 3, asset 1—asset attribute 1—asset attribute value 1, respectively. When the next hop triplet starts, the tail entity of the previous hop triplet is used as the head entity of the next hop triplet, which is continuously calculated, implements the "propagating" mentioned below.

The similarity between the embedding vector of the target asset and the head entity in the adjacent triplet in the relational space can be calculated by the following formula:

$$p_i = \text{softmax}(v^T R_i h_i)$$

Where, v represents the embedding vector of the target asset, R and h represent the embedding vector representations of the head entity and the tail entity in the adjacent triplet, respectively.

Then, the propagating to the tail entity of the adjacent triplet with the similarity as the weight is performed, and after n times of propagation by means of the graph convolutional network model, the final embedding vector of the user is obtained, where n is a positive integer. For example, the propagating to the tail entity t with $p_i$ as the weight is performed, where the output of the first hop triplet is:

$$o_u^1 = \Sigma_{(h_i, r_i, t_i) \in S_u} p_i t_i.$$

The n-hop process is repeated and the outputs of all hop triplets are added together as a response to obtain the final embedding vector of the user:

$$C = o_u^1 + o_u^2 + \ldots + o_u^n.$$

Where, $o_u^2, \ldots, o_u^n$ on represent the output of the second hop triplet, . . . , the output of the $n^{th}$ triplet, respectively. In practical applications, n may be 2. Of course, the value of n may also be set according to actual needs, which is not limited here.

Then, the embedding vector of the target asset and the final embedding vector of the user are spliced by means of the splicing layer of the graph convolutional network model to obtain the spliced vector, which can be expressed as: concat(C,v). The spliced vector integrates the embedding vector of the target asset and the final embedding vector of the user, which ensures that the information between the target asset and the user is fully integrated, and ensures the graph convolutional network model for a targeted evaluation of the value of the target asset to the user.

Then, the spliced vector is input into a fully connected layer of the graph convolutional network model, and a value of the target asset is output to the user by means of the fully connected layer, so as to realize the value evaluation of the target asset by means of the graph convolutional network model. After passing by means of the fully connected layer, the mapping relationship between the spliced vector and the value of the target asset to the user is determined, and based on the mapping relationship, the value of the target asset to the user can be accurately determined, thereby improving the accuracy of asset value evaluation for the user.

In the embodiment of the present disclosure, in order to determine the value of the target asset to the user, step S804: inputting the spliced vector into a fully connected layer of the graph convolutional network model, and outputting a value of the target asset to the user by means of the fully connected layer, includes:

obtaining the value of the target asset to the user by means of the fully connected layer of the graph convolutional network model by a following formula:

$$y = \sigma(concat(C, v) \cdot \omega + b).$$

Where, σ represents a sigmoid activation function, C represents the final embedding vector of the user, v represents the embedding vector of the target asset, w represents the weight, and b represents a bias.

In the embodiments of the present disclosure, since the embedding vector of the asset is determined based on the relationship between the asset and its own asset attribute, as well as the relationship between the asset and other entities, the accuracy of asset value evaluation for the user is improved.

Figure 13:
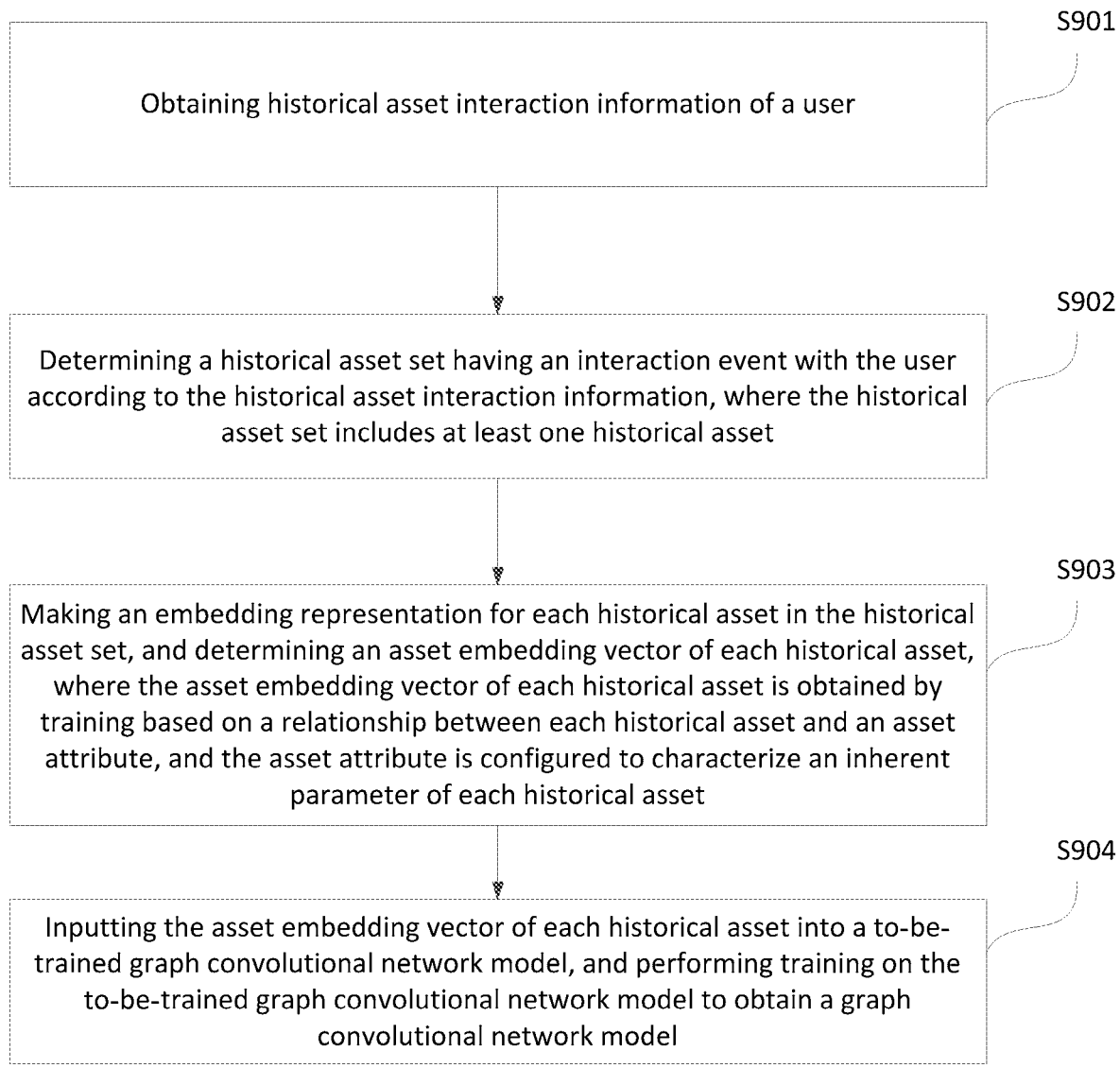
FIG. 13 is a method flowchart of a model training method provided by embodiments of the present disclosure.

Based on the same disclosed concept, as shown in FIG. 13, an embodiment of the present disclosure also provides a model training method, which can be applied to an asset value evaluation system, where the model training method includes:

S901: obtaining historical asset interaction information of a user;

S902: determining a historical asset set having an interaction event with the user according to the historical asset interaction information, where the historical asset set includes at least one historical asset;

S903: making an embedding representation for each historical asset in the historical asset set, and determining an asset embedding vector of each historical asset, where the asset embedding vector of each historical asset is obtained by training based on a relationship between each historical asset and an asset attribute, and the asset attribute is configured to characterize an inherent parameter of each historical asset; and S904: inputting the asset embedding vector of each historical asset into a to-be-trained graph convolutional network model, and performing training on the to-be-trained graph convolutional network model to obtain a graph convolutional network model.

In some embodiments, the specific implementation process of step S901 to step S904 is as follows.

Firstly, the historical interaction record(s) of the user in the self-asset value evaluation system can be collected, the historical asset interaction information of the user according to the historical interaction record(s) is determined, and then the historical asset set that has the interaction event with the user is determined according to the historical asset interaction information. The historical asset set includes at least one historical asset, where the interactive event can be the application, purchase, litigation, transfer, etc., and then, an embedding representation is made for each historical asset in the historical asset set, so as to determine the asset embedding vector of each of the historical assets. Since the asset embedding vector of each of the historical assets is obtained by training based on the relationship between each historical asset and asset attribute, the asset attribute is configured to characterize the inherent parameter of the historical asset, and the asset embedding vector of the historical asset not only integrates the entity corresponding to the asset itself, but also integrates the relationship between the entity and the asset attribute of the entity itself. Then, the asset embedding vector corresponding to each of the historical assets is input into the to-be-trained graph convolutional network model, and the to-be-trained graph convolutional network model is trained to obtain the graph convolutional network model. Since the asset embedding vector input into the to-be-trained graph convolutional network model is obtained by training based on the relationship between each historical asset and asset attribute, the asset embedding vector of the historical asset integrates the relationship between the historical asset and the asset attribute of the historical asset itself, and when using the asset embedding vector of the historical asset to train the to-be-trained graph convolutional network model, the relevant information of the historical asset can be determined more accurately, which improving the training accuracy of the model used for asset evaluation.

Figure 14:
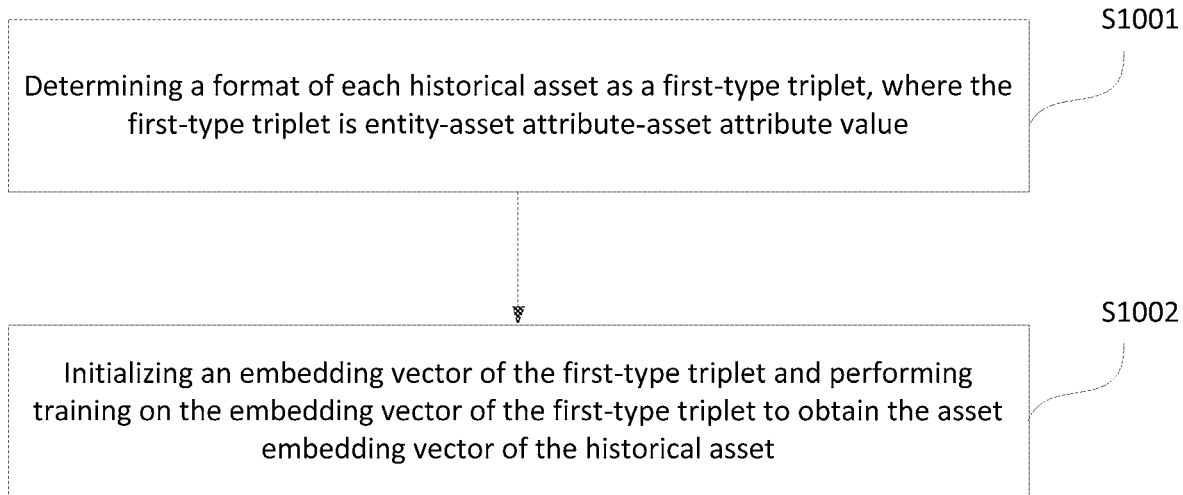
FIG. 14 is a method flowchart of a training process based on a relationship between each historical asset and an asset attribute in a step S903 in FIG. 13.

In the embodiment of the present disclosure, as shown in FIG. 14, in step S903: the training process based on the relationship between each historical asset and asset attribute includes:

S1001: determining a format of each historical asset as a first-type triplet, where the first-type triplet is entity-asset attribute-asset attribute value; and S1002: initializing an embedding vector of the first-type triplet and performing training on the embedding vector of the first-type triplet to obtain the asset embedding vector of the historical asset.

In some embodiments, the specific implementation process of step S1001 to step S1003 is as follows.

First, a first-type triplet in a format that is entity-asset attribute-asset attribute value in each asset is determined, and the format of the first-type triplet can be expressed as (h,a,a_value), where h represents an entity in the first-type triplet, a represents an asset attribute in the first-type triplet, and a_value represents an asset attribute value in the first-type triplet. For example, for the triplet (patent 1, legal status, public), "patent 1" means the entity, "legal status" means the asset attribute, and "public" means the asset attribute value. For another example, for the triplet (patent 1, number of claims, 30), "patent 1" represents the entity, "number of claims" represents the asset attribute, and "30" represents the "asset attribute value". Yet for another example, for the triplet (patent 1, number of times involved in litigation, 5), "patent 1" represents the entity, "number of times involved in litigation" represents the asset attribute, and "5" represents the "asset attribute value". Of course, the first-type triplet of the historical asset may also be constructed according to actual application needs, and no further examples are given here. In some embodiments, the first-type triplet can be constructed based on the asset attributes that have a greater impact on the asset value. For example, the "legal status", "number of claims" and "number of times involved in litigation" of patents often have a greater impact on the values of patents. By constructing the first-type triplet including the asset attribute, the asset attribute value corresponding to the asset attribute of the historical asset itself is fully considered, so that the value of the corresponding patent can be accurately determined. Based on the same realization principle, by means of the construction of the first-type triplet, the accuracy of training the model for asset value evaluation can be improved.

Then, the embedding vector of the first-type triplet is initialized and trained to obtain the asset embedding vector of the historical asset. Since the constructed first-type triplet fully considers the asset attribute value corresponding to the asset attribute of the entity itself, after the embedding vector of the first-type triplet is initialized and trained, the obtained asset embedding vector of the historical asset fully considers the relationship between the historical asset and the inherent asset attribute of the historical asset itself. In this case, the training for the to-be-trained graph convolutional network model based on the asset embedding vector of the historical asset improves the accuracy of the training model for asset evaluation.

Figure 15:
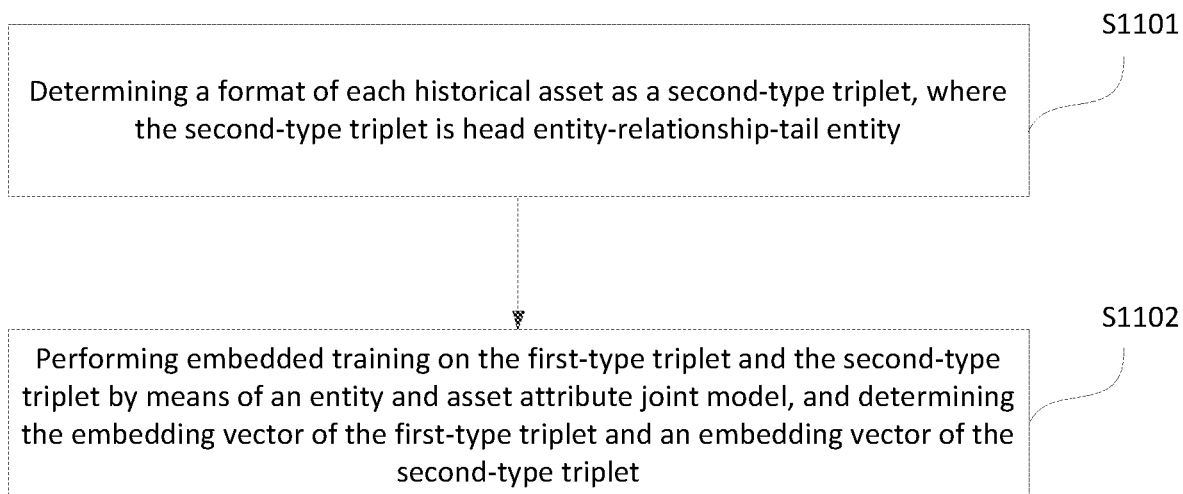
FIG. 15 is another method flowchart of a training process based on a relationship between each historical asset and an asset attribute in a step S903 in FIG. 13.

In the embodiment of the present disclosure, as shown in FIG. 15, in step S903: the training process based on an entity and an asset attribute of each historical asset further includes:

S1101: determining a format of each historical asset as a second-type triplet, where the second-type triplet is head entity-relationship-tail entity; and S1102: performing embedded training on the first-type triplet and the second-type triplet by means of an entity and asset attribute joint model, and determining the embedding vector of the first-type triplet and an embedding vector of the second-type triplet.

It should be noted that the embedded training on the first-type triplet and the second-type triplet is performed by means of the entity and asset attribute joint model, and the specific implementation process of determining the first-type triplet and the second-type triplet are determined can refer to the description of the relevant part in the aforementioned asset value evaluation method, which will not be repeated here.

Figure 16:
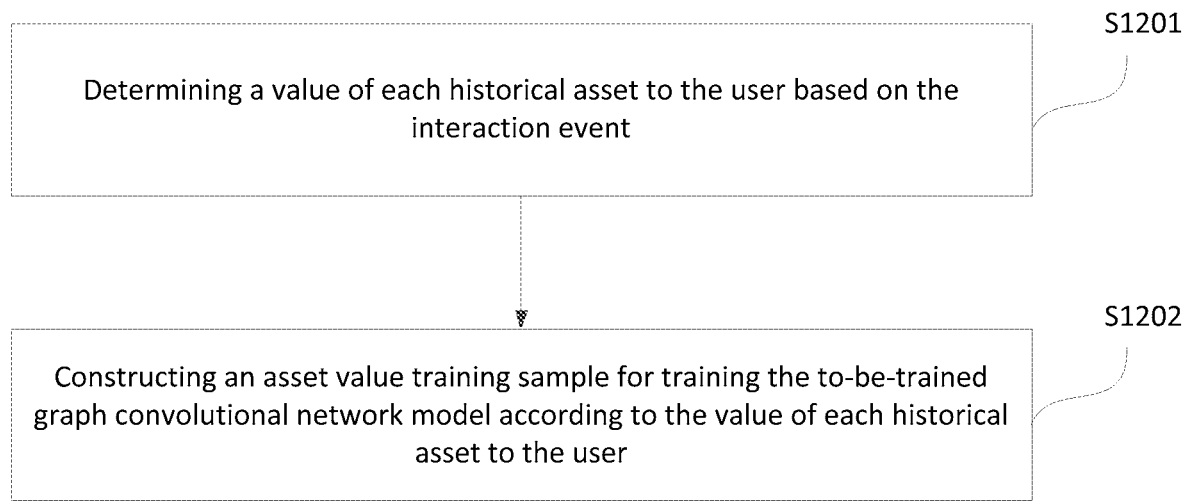
FIG. 16 is a flow chart of a method after a step S902.

In the embodiment of the present disclosure, as shown in FIG. 16, in step S902: after determining, according to the historical asset interaction information, the historical asset set having the interaction event with the user, the method further includes:

S1201: determining a value of each historical asset to the user based on the interaction event; and S1202: constructing an asset value training sample for training the to-be-trained graph convolutional network model according to the value of each historical asset to the user.

The specific process of determining the value of each historical asset to the user in steps S1201 to S1202, and constructing the asset value training sample, can refer to the description of the relevant part in the aforementioned asset value evaluation method, which will not be repeated here.

Figure 17:
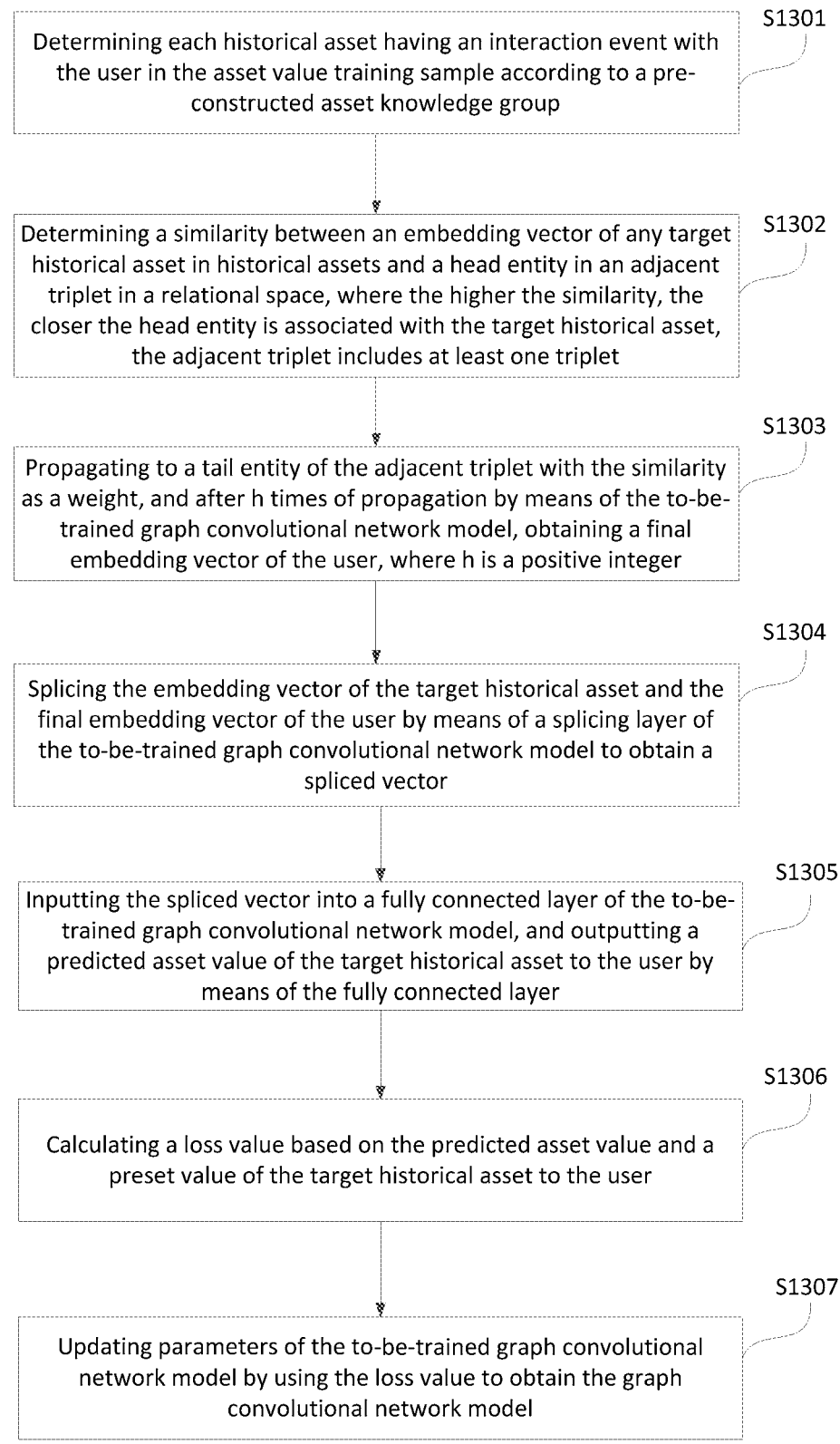
FIG. 17 is a flow chart of a method in a step S904 in FIG. 13.

In the embodiment of the present disclosure, as shown in FIG. 17, step S904: the inputting the asset embedding vector of each historical asset into the to-be-trained graph convolutional network model, and performing training on the to-be-trained graph convolutional network model to obtain the graph convolutional network model, includes:

S1301: determining each historical asset having an interaction event with the user in the asset value training sample according to a pre-constructed asset knowledge group;

S1302: determining a similarity between an embedding vector of any target historical asset in historical assets and a head entity in an adjacent triplet in a relational space, where the higher the similarity, the closer the head entity is associated with the target historical asset, the adjacent triplet includes at least one triplet;

S1303: propagating to a tail entity of the adjacent triplet with the similarity as a weight, and after h times of propagation by means of the to-be-trained graph convolutional network model, obtaining a final embedding vector of the user, where h is a positive integer;

S1304: splicing the embedding vector of the target historical asset and the final embedding vector of the user by means of a splicing layer of the to-be-trained graph convolutional network model to obtain a spliced vector;

S1305: inputting the spliced vector into a fully connected layer of the to-be-trained graph convolutional network model, and outputting a predicted asset value of the target historical asset to the user by means of the fully connected layer;

S1306: calculating a loss value based on the predicted asset value and a preset value of the target historical asset to the user; and S1307: updating parameters of the to-be-trained graph convolutional network model by using the loss value to obtain the graph convolutional network model.

In some embodiments, the specific implementation process of steps S1301 to S1307 is as follows.

First, according to a pre-constructed asset knowledge group, each historical asset having an interaction event with the user in the asset value training sample is determined. The construction process of the asset knowledge group can refer to the description of the relevant part of the aforementioned asset value evaluation method, which will not be repeated here. Then, a similarity between an embedding vector of any target historical asset in historical assets and a head entity in an adjacent triplet in a relational space is determined, where the higher the similarity, the closer the head entity is associated with the target historical asset, the adjacent triplet includes at least one triplet. The target historical asset is taken as the head entity h, and starting from the head entity h, it searches for the relationship r and the tail entity t, and the similarity between the embedding vector of the target historical asset and the head entity in the adjacent triplet in the relationship space by the following formula: $p_i$=softmax $(v^T R_i h_i)$.

Where, v represents the embedding vector of the target historical asset, R and h represent the embedding vector representations of the relationship and the head entity in the adjacent triplet, respectively.

Then, the similarity as weight is configured to propagate to the tail entity of the adjacent triplet, and the output of the first hop triplet is: $o_u^1 = \Sigma_{(h_i, r_i, t_i) \in S_u^1} p_i t_i$.

After n times of propagation of the to-be-trained graph convolutional network model, the final embedding vector of the user is obtained, and n is a positive integer. The final embedding vector of the user is:

$$C = o_u^1 + o_u^2 + \ldots + o_u^n.$$

Where, $o_u^2, \ldots, o_u^n$ represent the output of the second hop triplet, . . . , the output of the $n^{th}$ triplet, respectively.

Then, the embedding vector of the target historical asset and the final embedding vector of the user are spliced by means of a splicing layer of the to-be-trained graph convolutional network model to obtain a spliced vector concat(C, v). Then, the spliced vector is input into a fully connected layer of the to-be-trained graph convolutional network model, and a predicted asset value y=σ(concat(C, v)·ω+b) of the target historical asset is output to the user by means of the fully connected layer.

Where, σ represents a sigmoid activation function, C represents the final embedding vector of the user, v represents the embedding vector of the target historical asset, w represents the weight, and b represents a bias.

Then, a loss value based on the predicted asset value and a preset value of the target historical asset to the user is calculated; further, the loss value is configured to update parameters of the to-be-trained graph convolutional network model to obtain the graph convolutional network model.

In the embodiment of the present disclosure, step S1206: the calculating the loss value according to the predicted asset value and the preset value of the target historical asset to the user includes, includes:

calculating the loss value by a following formula:

$$\text{loss} = \frac{1}{2}(\text{output} - \text{value})^2 + \frac{\lambda_1}{2} \sum_{r \in R} \|I_r - E^T R E\|_2^2 + \frac{\lambda_2}{2}\left(\|V\|_2^2 + \|E\|_2^2 + \sum_{r \in R} \|R\|_2^2\right)$$

where output represents the predicted asset value, value represents the preset value, λ1 and λ2 represent hyperparameters, r represents a relationship embedding vector, R represents a relationship matrix, I represents a quality of a triplet, and E represents an entity matrix in the asset knowledge group, V represents the parameters of the to-be-trained graph convolutional network model.

After the aforementioned training the to-be-trained graph convolutional network mode and obtaining the trained graph convolutional network model, and after inputting the asset value query information for the user, the corresponding asset set can be input into the graph convolutional network model, and the value of each asset in the asset set is returned, thereby realizing the personalized value evaluation for different users.

It should be noted that if the user's historical asset interaction information currently exists, the user's personalized asset value evaluation can be realized by means of online learning. That is to say, it is necessary to train an asset value evaluation model based on the corresponding user, thereby ensuring the accuracy of the asset value evaluation of the corresponding user. If there is no historical asset interaction information of the user at present, that is, the user is a new user, e.g., which can be a company applying for a patent for the first time, or a user who purchases a mobile phone for the first time, and the corresponding interaction events can be recorded. After accumulating certain historical asset information, the online learning method is called to retrain the parameters of the to-be-trained graph convolutional network model, and then the asset value evaluation of the user's related assets can be performed, thereby improving the accuracy of the asset value evaluation.

The problem-solving principle of the model training method provided by the embodiments of the present disclosure is similar to that of the asset value evaluation method described above. The relevant implementation process can refer to the description of relevant parts in the asset value evaluation method described above, and the repetition will not be repeated.

Based on the same disclosed concept, an embodiment of the present disclosure also provides an asset value evaluation apparatus, which includes:

a first memory and a first processor;
where the first memory is configured to store computer programs; and
the first processor is configured to execute the computer programs in the first memory to perform following steps:
obtaining input asset value query information for a user;
when determining historical asset interaction information of the user exists, determining an asset set queried by using the asset value query information, where the asset set includes at least one asset;
performing an embedding representation for each asset in the asset set, and determining an asset embedding vector of each asset, where the asset embedding vector is obtained by training based on a relationship between each asset and asset attribute, and the asset attribute is configured to characterize an intrinsic parameter of the asset; and
obtaining a value of each asset to the user by inputting the asset embedding vector of each asset into a graph convolutional network model.

Based on the same disclosed concept, an embodiment of the present disclosure also provides a model training apparatus, which includes:

a second memory and a second processor;
where the second memory is configured to store computer programs; and
the second processor is configured to execute the computer programs in the second memory to perform following steps:
obtaining historical asset interaction information of a user;

determining a historical asset set having an interaction event with the user according to the historical asset interaction information, where the historical asset set includes at least one historical asset;

making an embedding representation for each historical asset in the historical asset set, and determining an asset embedding vector of each historical asset, where the asset embedding vector of each historical asset is obtained by training based on a relationship between each historical asset and an asset attribute, and the asset attribute is configured to characterize an inherent parameter of each historical asset; and inputting the asset embedding vector of each historical asset into a to-be-trained graph convolutional network model, and performing training on the to-be-trained graph convolutional network model to obtain a graph convolutional network model.

Based on the same disclosed concept, an embodiment of the present disclosure also provides a computer-readable storage medium, where:

computer instructions which is stored in the computer readable storage medium, when the computer instructions are run on a computer, causes the computer to execute the asset value evaluation method described above or the model training method described above.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to disk storage, CD-ROM, optical storage, etc.) having computer-usable program code embodied therein.

The present disclosure is described with reference to flowchart illustrations and/or block diagrams of methods, apparatus (systems), and computer program products according to the present disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, special purpose computer, embedded processor, or processor of other programmable data processing equipment to produce a machine, such that the instructions executed by the processor of the computer or other programmable data processing equipment produce an apparatus for realizing the functions specified in one or more procedures of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory produce an article of manufacture including instruction means, the instruction means realizes the function specified in one or more procedures of the flowchart and/or one or more blocks of the block diagram.

These computer program instructions can also be loaded onto a computer or other programmable data processing device, causing a series of operational steps to be performed on the computer or other programmable device to produce a computer-implemented process, thereby the instructions provide steps for implementing the functions specified in the flow chart or blocks of the flowchart and/or the block or blocks of the block diagrams.

While preferred embodiments of the present disclosure have been described, additional changes and modifications can be made to these embodiments by those skilled in the art once the basic inventive concept is appreciated. Therefore, it is intended that the appended claims be construed to cover the preferred embodiment and all changes and modifications which fall within the scope of the present disclosure.

Obviously, those skilled in the art can make various changes and modifications to the application without departing from the spirit and scope of the application. In this way, if these modifications and variations of the present application fall within the scope of the claims of the present application and their equivalent technologies, the present application is also intended to include these modifications and variations.

What is claimed is:

1. An asset value evaluation method, comprising:

obtaining input asset value query information for a user;

when determining historical asset interaction information of the user exists, determining an asset set queried by using the asset value query information, wherein the asset set comprises at least one asset;

performing an embedding representation for each asset in the asset set, and determining an asset embedding vector of each asset, wherein the asset embedding vector is obtained by training based on a relationship between each asset and asset attribute, and the asset attribute is configured to characterize an intrinsic parameter of the asset; and obtaining a value of each asset to the user by inputting the asset embedding vector of each asset into a graph convolutional network model;

wherein the obtaining the value of each asset to the user by inputting the asset embedding vector of each asset into the graph convolutional network model comprises:

determining a similarity between an embedding vector of any target asset in the asset set and a head entity in an adjacent triplet in a relational space, wherein the higher the similarity, the closer the head entity in the adjacent triplet is associated with the target asset, the adjacent triplet comprises at least one triplet;

propagating to a tail entity of the adjacent triplet with the similarity as a weight, and after n times of propagation by means of the graph convolutional network model, obtaining a final embedding vector of the user, wherein n is a positive integer;

splicing the embedding vector of the target asset and the final embedding vector of the user by means of a splicing layer of the graph convolutional network model to obtain a spliced vector; and inputting the spliced vector into a fully connected layer of the graph convolutional network model, and outputting a value of the target asset to the user by means of the fully connected layer.

2. The method according to claim 1, wherein a training process based on the relationship between the asset and the asset attribute comprises:

determining a format of each asset as a first-type triplet, wherein the first-type triplet is entity-asset attribute-asset attribute value; and initializing an embedding vector of the first-type triplet and performing training on the embedding vector of the first-type triplet to obtain the asset embedding vector.

3. The method according to claim 2, wherein the initializing the embedding vector of the first-type triplet comprises:
  encoding the first-type triplet to obtain an initialization embedding vector of the first-type triplet.

4. The method according to claim 3, wherein the training process based on the relationship between the asset and the asset attribute further comprises:
  determining a format of each asset as a second-type triplet, wherein the second-type triplet is head entity-relationship-tail entity; and
  performing embedded training on the first-type triplet and the second-type triplet by means of an entity and asset attribute joint model, and determining the embedding vector of the first-type triplet and an embedding vector of the second-type triplet.

5. The method according to claim 4, wherein the entity and asset attribute joint model comprises a first graph embedding translate model and a second graph embedding translate model; and the performing the embedded training on the first-type triplet and the second-type triplet by means of the entity and asset attribute joint model, and determining the embedding vector of the first-type triplet and the embedding vector of the second-type triplet comprises:
  performing, based on the initialization embedding vector of the first-type triplet, the embedded training on the first-type triplet by means of the first graph embedding translate model in the entity and asset attribute joint model;
  performing the embedded training on the second-type triplet by means of the second graph embedding translate model in the entity and asset attribute joint model; and
  performing joint loss training based on a loss function of the first graph embedding translate model and a loss function of the second graph embedding translate model to obtain the embedding vectors of the first-type triplet and the second-type triplet.

6. The method according to claim 1, wherein, before the obtaining the input asset value query information for the user, the method further comprises:
  constructing an asset knowledge graph, wherein the asset knowledge graph comprises multiple first-type triplets in a format that is entity-asset attribute-asset attribute value and multiple second-type triplets in a format that is head entity-relationship-tail entity.

7. The method according to claim 6, wherein, before the obtaining the input asset value query information for the user, the method further comprises:
  determining a historical asset set having an interaction event with the user according to the asset knowledge graph, wherein the historical asset set comprises at least one historical asset;
  constructing an asset value training sample according to the historical asset set; and
  performing training on the graph convolutional network model according to the asset value training sample, wherein an asset value in the asset value training sample to the user is determined according to the interaction event.

8. The method according to claim 7, wherein determining the asset value in the asset value training sample to the user according to the interaction event comprises:
  determining a path length between a node where the user is located and a node where each historical asset in the historical asset set is located in the asset knowledge graph; and
  determining a value of each historical asset in the historical asset set to the user according to the interaction event and the path length, wherein the longer the path length, the lower the value of the historical asset corresponding to the path to the user.

9. The method according to claim 8, wherein, the determining the value of each historical asset in the historical asset set to the user according to the interaction event and the path length comprises:
  determining the value of each historical asset in the historical asset set to the user by a following formula:

$$V = A^{l-1} basevalue;$$

wherein, l represents the path length between the node where the user is located and the node where each historical asset in the historical asset set is located, basevalue represents a base value corresponding to the interaction event, and A is a constant less than 1.

10. The method according to claim 1, wherein the inputting the spliced vector into a fully connected layer of the graph convolutional network model, and outputting a value of the target asset to the user by means of the fully connected layer comprises:
  obtaining the value of the target asset to the user by means of the fully connected layer of the graph convolutional network model by a following formula:

$$y = \sigma(concat(C, v) \cdot \omega + b);$$

wherein σ represents a sigmoid activation function, C represents the final embedding vector of the user, v represents the embedding vector of the target asset, W represents the weight, and b represents a bias.

11. The method according to claim 1, wherein the obtaining the input asset value query information for the user comprises:
  obtaining input user information configured to characterize the user and a to-be-evaluated asset set, to cause that the graph convolutional network model outputs a value of each to-be-evaluated asset in the to-be-evaluated asset set to the user.

12. The method according to claim 1, wherein the obtaining the input asset value query information for the user comprises:
  obtaining input user information configured to characterize the user, to cause that the graph convolutional network model outputs at least one asset whose value to the user meets a preset value.

13. A model training method, comprising:
  obtaining historical asset interaction information of a user;
  determining a historical asset set having an interaction event with the user according to the historical asset interaction information, wherein the historical asset set comprises at least one historical asset;
  making an embedding representation for each historical asset in the historical asset set, and determining an asset embedding vector of each historical asset, wherein the asset embedding vector of each historical asset is obtained by training based on a relationship between each historical asset and an asset attribute, and the asset attribute is configured to characterize an inherent parameter of each historical asset; and inputting the asset embedding vector of each historical asset into a to-be-trained graph convolutional network model, and performing training on the to-be-trained graph convolutional network model to obtain a graph convolutional network model;

wherein the inputting the asset embedding vector of each historical asset into the to-be-trained graph convolutional network model, and performing training on the to-be-trained graph convolutional network model to obtain the graph convolutional network model comprises:

determining each historical asset having an interaction event with the user in the asset value training sample according to a pre-constructed asset knowledge group;

determining a similarity between an embedding vector of any target historical asset in historical assets and a head entity in an adjacent triplet in a relational space, wherein the higher the similarity, the closer the head entity is associated with the target historical asset, the adjacent triplet comprises at least one triplet;

propagating to a tail entity of the adjacent triplet with the similarity as a weight, and after n times of propagation by means of the to-be-trained graph convolutional network model, obtaining a final embedding vector of the user, wherein n is a positive integer;

splicing the embedding vector of the target historical asset and the final embedding vector of the user by means of a splicing layer of the to-be-trained graph convolutional network model to obtain a spliced vector;

inputting the spliced vector into a fully connected layer of the to-be-trained graph convolutional network model, and outputting a predicted asset value of the target historical asset to the user by means of the fully connected layer;

calculating a loss value based on the predicted asset value and a preset value of the target historical asset to the user; and updating parameters of the to-be-trained graph convolutional network model by using the loss value to obtain the graph convolutional network model.

14. The method according to claim 13, wherein a training process based on the relationship between each historical asset and an asset attribute comprises:

determining a format of each historical asset as a first-type triplet, wherein the first-type triplet is entity-asset attribute-asset attribute value; and initializing an embedding vector of the first-type triplet and performing training on the embedding vector of the first-type triplet to obtain the asset embedding vector of the historical asset.

15. The method according to claim 14, wherein the training process based on an entity and an asset attribute of each historical asset further comprises:

determining a format of each historical asset as a second-type triplet, wherein the second-type triplet is head entity-relationship-tail entity; and performing embedded training on the first-type triplet and the second-type triplet by means of an entity and asset attribute joint model, and determining the embedding vector of the first-type triplet and an embedding vector of the second-type triplet.

16. The method according to claim 13, wherein, after determining the historical asset set having the interaction event with the user according to the historical asset interaction information, the method further comprises:

determining a value of each historical asset to the user based on the interaction event; and constructing an asset value training sample for training the to-be-trained graph convolutional network model according to the value of each historical asset to the user.

17. An asset value evaluation apparatus, comprising:

a first memory and a first processor;

wherein the first memory is configured to store computer programs; and the first processor is configured to execute the computer programs in the first memory to perform following steps:

obtaining input asset value query information for a user;

when determining historical asset interaction information of the user exists, determining an asset set queried by using the asset value query information, wherein the asset set comprises at least one asset;

performing an embedding representation for each asset in the asset set, and determining an asset embedding vector of each asset, wherein the asset embedding vector is obtained by training based on a relationship between each asset and asset attribute, and the asset attribute is configured to characterize an intrinsic parameter of the asset; and obtaining a value of each asset to the user by inputting the asset embedding vector of each asset into a graph convolutional network model;

wherein the first processor is further configured to execute the computer programs in the first memory to perform following steps:

determining a similarity between an embedding vector of any target asset in the asset set and a head entity in an adjacent triplet in a relational space, wherein the higher the similarity, the closer the head entity in the adjacent triplet is associated with the target asset, the adjacent triplet comprises at least one triplet;

propagating to a tail entity of the adjacent triplet with the similarity as a weight, and after n times of propagation by means of the graph convolutional network model, obtaining a final embedding vector of the user, wherein n is a positive integer;

splicing the embedding vector of the target asset and the final embedding vector of the user by means of a splicing layer of the graph convolutional network model to obtain a spliced vector; and inputting the spliced vector into a fully connected layer of the graph convolutional network model, and outputting a value of the target asset to the user by means of the fully connected layer.

18. A non-transitory computer readable storage medium, wherein:

computer instructions which is stored in the computer readable storage medium, when the computer instructions are run on a computer, causes the computer to execute the asset value evaluation method according to claim 1.

* * * * *